(12) United States Patent
Green et al.

(10) Patent No.: US 10,375,173 B2
(45) Date of Patent: *Aug. 6, 2019

(54) METHOD AND APPARATUS FOR DETERMINING INTEGRITY OF DATA FEED FOR INTERNET OF THINGS

(71) Applicant: Iotic Labs Limited, Cambridge (GB)

(72) Inventors: Paul Nigel Green, Essex (GB); Mark Nicholas James Wharton, Bury St Edmunds (GB)

(73) Assignee: Iotic Labs Limited, Cambridge (GB)

( * ) Notice: Subject to any disclaimer, the term of this patent is extended or adjusted under 35 U.S.C. 154(b) by 381 days.

This patent is subject to a terminal disclaimer.

(21) Appl. No.: 15/028,382

(22) PCT Filed: Aug. 13, 2014

(86) PCT No.: PCT/GB2014/052491
§ 371 (c)(1),
(2) Date: Apr. 8, 2016

(87) PCT Pub. No.: WO2015/052482
PCT Pub. Date: Apr. 16, 2015

(65) Prior Publication Data
US 2016/0255066 A1    Sep. 1, 2016

Related U.S. Application Data

(60) Provisional application No. 61/888,472, filed on Oct. 8, 2013.

(51) Int. Cl.
*H04W 4/60* (2018.01)
*H04W 4/70* (2018.01)
(Continued)

(52) U.S. Cl.
CPC .......... *H04L 67/12* (2013.01); *H04L 41/0806* (2013.01); *H04L 41/0823* (2013.01);
(Continued)

(58) Field of Classification Search
CPC . H04L 67/12; H04L 41/0806; H04L 41/0823; H04L 61/15; H04L 63/08;
(Continued)

(56) References Cited

U.S. PATENT DOCUMENTS 6,662,195 B1 † 12/2003 Langseth
2005/0209927 A1 * 9/2005 Aaltonen ........... G06Q 30/0601
705/26.1

(Continued)

OTHER PUBLICATIONS

International Search Report in related PCT Application No. PCT/GB2014/052489 dated Nov. 14, 2014.
(Continued)

*Primary Examiner* — Harunur Rashid
*Assistant Examiner* — Sakinah White Taylor
(74) *Attorney, Agent, or Firm* — Greenberg Traurig, LLP

(57) ABSTRACT

Methods and registrar computers for determining the integrity of a data feed provided by a virtual device. In an example, the method includes maintaining a control directory of virtual devices registered with the registrar computer and a data feed directory comprising entries indicating data feeds available from the registered virtual devices. Each data feed in the data feed directory is assigned an integrity indicator based on the provenance of the data feed.

8 Claims, 17 Drawing Sheets

(51) Int. Cl.
| | |
|---|---|
| H04W 12/12 | (2009.01) |
| H04L 29/08 | (2006.01) |
| H04L 29/06 | (2006.01) |
| H04W 12/06 | (2009.01) |
| H04W 12/10 | (2009.01) |
| H04L 12/24 | (2006.01) |
| H04L 29/12 | (2006.01) |

(52) U.S. Cl.
CPC .............. *H04L 61/15* (2013.01); *H04L 63/08* (2013.01); *H04L 63/10* (2013.01); *H04L 63/1433* (2013.01); *H04L 65/1069* (2013.01); *H04L 65/1073* (2013.01); *H04L 65/1083* (2013.01); *H04L 67/02* (2013.01); *H04L 67/10* (2013.01); *H04L 67/28* (2013.01); *H04L 67/2804* (2013.01); *H04L 67/2809* (2013.01); *H04L 67/32* (2013.01); *H04W 4/60* (2018.02); *H04W 4/70* (2018.02); *H04W 12/06* (2013.01); *H04W 12/10* (2013.01); *H04L 63/12* (2013.01); *H04L 63/1458* (2013.01); *H04W 12/12* (2013.01); *Y04S 40/18* (2018.05)

(58) Field of Classification Search
CPC . H04L 63/10; H04L 63/1433; H04L 65/1069; H04L 65/1073; H04L 65/1083; H04L 67/02; H04L 67/10; H04L 67/28; H04L 67/2804; H04L 67/2809; H04L 67/32; H04L 63/12; H04L 63/1458; H04W 4/005; H04W 12/06; H04W 12/10; H04W 12/12; Y04S 40/18
USPC .......................................................... 726/4
See application file for complete search history.

(56) References Cited

U.S. PATENT DOCUMENTS

| | | | |
|---|---|---|---|
| 2006/0242641 A1† | 10/2006 | Kinsey et al. | |
| 2007/0100959 A1* | 5/2007 | Eichstaedt | H04L 67/306 709/217 |
| 2008/0021963 A1* | 1/2008 | Jana | G06F 17/3089 709/206 |
| 2008/0168550 A1* | 7/2008 | Choudhury | H04L 43/00 726/13 |
| 2011/0066715 A1 | 3/2011 | Schieder et al. | |
| 2014/0359476 A1 | 12/2014 | Wakeford et al. | |
| 2015/0244735 A1† | 8/2015 | Kumar et al. | |

OTHER PUBLICATIONS

Written Opinion in related PCT Application No. PCT/GB2014/052489 dated Nov. 14, 2014.
International Search Report in related PCT Application No. PCT/GB2014/052488 dated Jan. 23, 2015.
Written Opinion in related PCT Application No. PCT/GB2014/052488 dated Jan. 23, 2015.
International Search Report in related PCT Application No. PCT/GB2014/052492 dated Oct. 31, 2014.
Written Opinion in related PCT Application No. PCT/GB2014/052492 dated Oct. 31, 2014.
International Search Report in related PCT Application No. PCT/GB2014/053026 dated Mar. 19, 2015.
Written Opinion in related PCT Application No. PCT/GB2014/053026 dated Mar. 19, 2015.
International Search Report in related PCT Application No. PCT/GB2014/052490 dated Aug. 13, 2014.
Written Opinion in related PCT Application No. PCT/GB2014/052490 dated Aug. 13, 2014.
International Search Report in related PCT Application No. PCT/GB2014/052487 dated Feb. 2, 2015.
Written Opinion in related PCT Application No. PCT/GB2014/052487 dated Feb. 2, 2015.
"3rd Generation Partnership Project; Technical Specification Group Services and System Aspects; IP Multimedia Subsystem (IMS) centralized services (Release 8)", 3GPP Standard; 3GPP TR 23.892, 3rd Generation Dartnership Project (3GPP), Mobile Competence Centre ; 650, Route Des Lucioles ; F-06921 Sophia-Antipolis Cedex; France, No. V8.0.1, Mar. 1, 2008 (Mar. 1, 2008), pp. 1-167, XP050364164, paragraph [03.1] paragraphs [6.2.1]-[6.2.2.2.2]; figures 6.2.1-1 paragraphs [06.7]-[6.7.1a.1.2]; figures 6.7.1-1.
Moyer D Marples S Tsang J Katz P Gurung T Cheng a Dutta Telcordia Technologies H Schulzrinne Columbia University Arjun Roychowdhur: "Framework Draft for Networked Appliances using the Session Initiation Protocol; draft-moyer-sip-appliances-framework-02.txt", 20010601, No. 2, Jun. 1, 2001 (Jun. 1, 2001), XP015032766, ISSN: 0000-0004 paragraph [004.]; figure 4.
Simon Tsang Stan Moyer Dave Marples Telcordia Technologies et al: "SIP Extensions for Corrimunicaiirly with Networked Appliances; dtait-tsang-sip-applianees-do-00.txt", Nov. 1, 2000, 1 Novel-T-113e( 2000 (Nov. 1, 2000), XP015036219, ISSN: 0000-0004 paragraphs [004.]-[5.2.]; figure 2.
Berger S et al: "Ubiquitous computing using SIP", NOSSDAV'03; [Proceedings of the International Workshop on Network and Operating System Support for Digital Audio and Video (NOSSDAV)],Monterey, California, USA, Jun. 1, 2003 (Jun. 1, 2003), pp. 82-89, XP002340516, DOI: 10.1145/776322.776336 ISBN: 978-1-58113-694-4 paragraph [3.5.2.].
International Search Report in related PCT Application No. PCT/GB2014/052491 dated Oct. 30, 2014.
Written Opinion in related PCT Application No. PCT/GB2014/052491 dated Oct. 30, 2014.
Rodolfo Cartas et al: "An IMS Based Mobile Podcasting Architecture Supporting Multicast/Broadcast Delivery," Principles, Systems and Applications of IP Telecommunications. Services and Security for Next Generation Networks; [Lecture Notes in Computer Science], Springer Berlin Heidelberg, Berlin, Heidelberg, vol. 5310, Jul. 1, 2008 (Jul. 1, 2008), pp. 21-44, XP019109762, ISBN: 978-3-540-89053-9 paragraphs [005.]-[5.2.]; figures 8,10.
United States Patent and Trademark Office, Final Office Action issued in U.S. Appl. No. 15/028,410, dated Mar. 21, 2019, 10 pgs.
United States Patent and Trademark Office, Final Office Action issued in U.S. Appl. No. 15/028,416, dated Mar. 22, 2019, 10 pgs.
United States Patent and Trademark Office, Final Office Action issued in U.S. Appl. No. 15/028,395, dated Apr. 5, 2019, 11 pgs.

\* cited by examiner
† cited by third party

|  | Virtual Users | |
|---|---|---|
|  | Few consumers | Many consumers |
| Few producers | • Home alarm<br>• Only you and police know it's gone off | • Public single-value sensor<br>• Web cam |
| Many producers | • Aggregator node to service technician | • Met office weather stations |

Virtual Devices (row axis label)

FIG. 9

|  | Virtual Users | |
|---|---|---|
| Virtual Devices | Few producers | Many producers |
| Few consumers | • Light switch<br>• Security system | • Voting |
| Many consumers | • Power station<br>• Traffic lights | • Public street-lamp switching |

FIG. 10

METHOD AND APPARATUS FOR DETERMINING INTEGRITY OF DATA FEED FOR INTERNET OF THINGS

CROSS-REFERENCE TO RELATED APPLICATIONS

International Application No. PCT/GB2014/052491 entitled "METHOD AND APPARATUS FOR DETERMINING INTEGRITY OF DATA FEED FOR INTERNET OF THINGS," filed Aug. 13, 2014, which claims priority to U.S. Provisional Application Ser. No. 61/888,472 entitled "INTERNET OF THINGS," and filed Oct. 8, 2013, the contents of each of the aforementioned applications being incorporated by reference as if fully set forth herein.

TECHNICAL FIELD

The present invention discloses network arrangements, virtual devices, communication and control systems, authentication systems and methods for authenticating devices and data, suitable for use with the Internet and particularly the Internet of Things. There are also disclosed methods of operating the aforementioned arrangements, devices and systems.

BACKGROUND

The Internet of Things refers to uniquely identifiable objects in an internet-like structure. If all objects and people in daily life were equipped with identifiers, they could be managed and inventoried by computers. Much speculation has focused on the tagging of things using for example radio frequency identification (RFID) and technologies such as near field communication (NFC), barcodes, quick-response (QR) codes and digital watermarking.

Equipping all objects in the world with minuscule identifying devices or machine-readable identifiers could transform daily life. For instance, businesses may no longer run out of stock or generate waste products, as involved parties would know which products are consumed and required. Users could interact with devices remotely based on present or future needs.

However this bold vision is faced with a plethora of practical challenges. For example, it is not clear how, in practice the architecture would look and be operated so as to be safely controlled. It is not clear how devices producing data feeds and requestors consuming data feeds would be connected in a trusted manner. For example, requestors would have little or no information on the true identity or integrity of remote devices or the quality of the data they produce. Likewise conventional web based architectures and protocols would be vulnerable to security breaches and attacks, for example attacks in which requestors or devices pretend to be something they are not, and, denial of service attacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and registrar computers for determining the integrity of a data feed provided by a virtual device. In an example, the method includes maintaining a control directory of virtual devices registered with the registrar computer and a data feed directory comprising entries indicating data feeds available from the registered virtual devices. Each data feed in the data feed directory is assigned an integrity indicator based on the provenance of the data feed.

A first aspect provides a registrar computer configured to negotiate communications between at least one virtual device and at least one virtual requestor device, the registrar computer comprising: a first application interface configured to communicate with the at least one virtual device and the at least one virtual requestor device to maintain a control directory of virtual devices and virtual requestor devices and to maintain a data feed directory comprising entries indicating data feeds available to the at least one virtual requestor device from the at least one virtual device; and an integrity engine configured to assign an integrity indicator to each data feed in the data directory based on a provenance of the data feed.

A second aspect provides a method of determining the integrity of a data feed provided by a virtual device, the method comprising: maintaining a control directory of virtual devices registered with a registrar computer; maintaining a data feed directory comprising entries indicating data feeds available from the registered virtual devices; and assigning an integrity indicator to each data feed in the data directory based on a provenance of the data feed.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

FIGURES

Exemplary embodiments of the present invention are described herein below with reference to the accompanying drawings in which.

Figure 1:
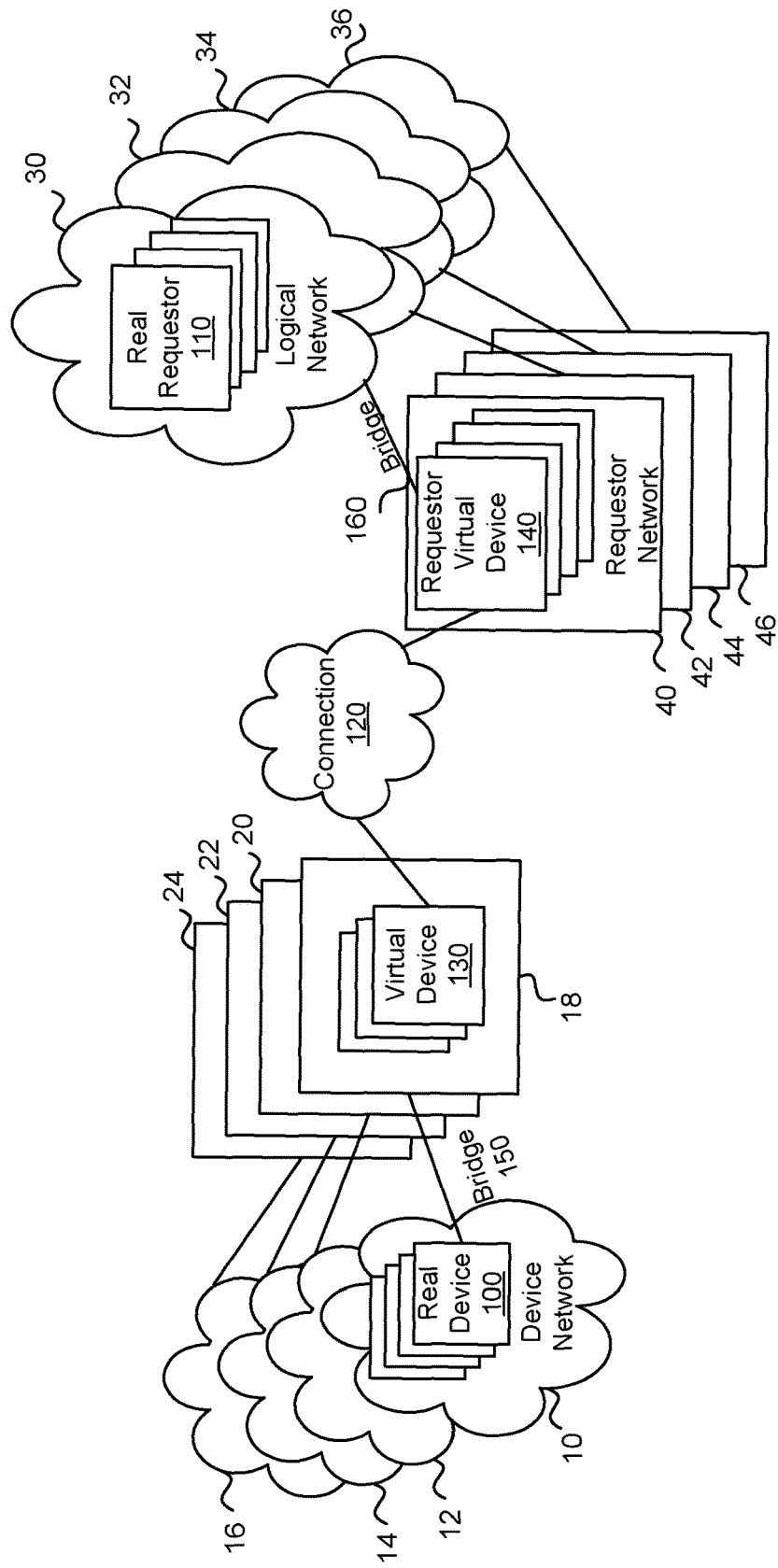
FIG. 1 is a schematic of a network according to an embodiment of the present invention.
Figure 11:
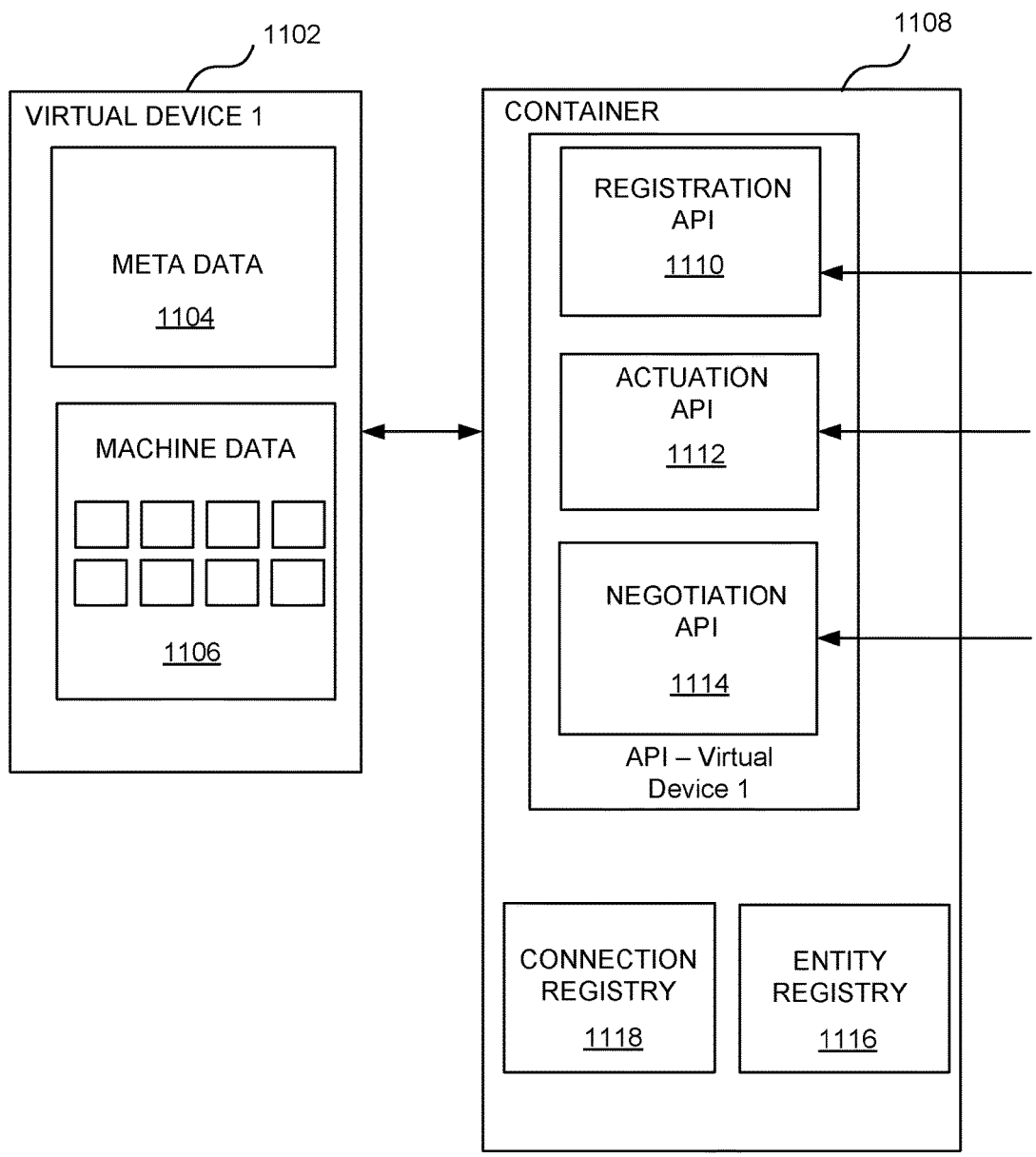

FIG. 9 indicates exemplary sensor use cases according to an embodiment of the present invention;

FIG. 10 indicates exemplary actuator use cases according to an embodiment of the present invention; and FIG. 11 is a schematic diagram of an alternative embodiment of the virtual device of FIG. 1.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Brokered Communication Between Virtual Devices

FIG. 1 is a schematic diagram of an embodiment of the present invention in which a plurality of device networks 10, 12, 14 and 16 each contain a population of real or simulated devices producing data and, optionally, consuming data or receiving control parameters. The real or simulated devices 100 are able to communicate with one or more real requestors 110 via a brokered connection 120. The requestors are typically geographically remote, but not necessarily. They may be located across a plurality of different logical networks 30, 32, 34, 36.

Each real or simulated device 100 has a counterpart virtual device 130 to which it is coupled by a bridge network 150. The virtual device 130 is a proxy representing the real or simulated device 100 running on for example a virtual device server, of which there may be many 18, 20, 22, 24. In one embodiment, the virtual device servers are web servers.

A real or simulated device 100 can be any device that can be identified. For example one or more of the real or simulated devices 100 may be an active device such as a microprocessor, a sensor or other device that is capable of actively identifying itself and generating and uploading data. The data uploaded from real or simulated devices is used to generate data feeds for consumption by real requestors 110. In another example, one or more of the real or simulated devices 100 may be a passive device such as a jumper or another item of clothing or any other passive device or object that can be passively identified by an identification tag or the like. A real requestor 110 can be any entity capable of requesting data from the population(s) of real or simulated devices, for example a human user or a machine user.

The bridge network 150 connecting real or simulated devices 100 and virtual devices 130 may be a public network or a private network, or a combination of both. For example the bridge 150 may be established through a portion of the Internet or the Internet of Things, or through a machine device specific protocol, such as message queuing telemetry transport (MQTT) running on a Virtual Private Network (VPN).

Each requesting entity 110 has a counterpart requestor virtual device 140 to which it is connected via a bridge network 160. A requestor virtual device 140 is a proxy representing a real requestor entity 110 and running on a virtual device server, which may be for example a web server. There may be many such virtual device servers 40, 42, 44, 46. The bridge network 160 connecting real requestors 110 and requestor virtual devices 140 may be any private or public network, or a combination of both. For example the bridge 150 may be established through a portion of the Internet or the Internet of Things, or through MQTT running on a VPN.

Brokered or negotiated connections may be established between a virtual device 130 and a requestor virtual device 140 in both directions. The connection 120 between a virtual device 130 and a requestor virtual device 140 may use any suitable connection capable of supporting machine to machine communication in this case between a virtual device 130 and a requestor virtual device 140. This connection may be established through a public network or private network or a combination of both public and private networks. For example the connection 120 may be established through a portion of the Internet or the Internet of Things, or through a machine device specific protocol, such as MQTT running on a VPN.

Machine to machine communications between virtual devices 130 (also referred to as "producer devices") and requestor virtual devices 140 are brokered or negotiated by a trusted registrar computer capable of managing communications between virtual devices according to API (application programming interface) and permissions data relating to the real or simulated devices. In this way, the devices and their data feeds can be authenticated and data feeds can be consumed without exposure to attacks, such as a denial of service attack. As will be explained hereinafter, it is also possible to authenticate data feeds combining data from multiple devices and new data feeds that have been created or modified by requestors. All such data feeds can be monitored, stored, and, if desired, published along with indications providing a measure of integrity of the data feed.

In this context, "authentication" means confirming the identity of an entity and or a truth relating to an attribute of the entity (and may mean both in the case of device authentication). Authentication may also be used herein to mean confirming the integrity of a datum or data feed (in the case of data authentication). As such the act of authentication might involve for example confirming the identity of a person, entity, device or software program, or tracing the origins of a person, entity, device, software program or a data feed. Authentication often involves verifying the validity of at least one form of identification.

Virtual devices 130, including requestor virtual devices 140, described herein are proxy devices generated by software running on a computer. A virtual device may have data from, or data input by, its counterpart real or simulated entity. For example a virtual device may run on a web server and may be implemented in any suitable computing language. In one embodiment virtual devices are run in their own thread on a web server. In the exemplary embodiment each virtual device has its own thread running on the web server. Alternatively, they may run as re-entrant code and may have any number of instances as may be necessary.

Each virtual device generates one or more data feeds, each of which, for the purposes of this description may be regarded as comprising some form of output data payload and/or some form of input parameters. Indeed when viewed like this, virtual devices (including requestor virtual devices) are proxy constructs configured to present a data feed according to access criteria settable by the virtual device. A virtual device data feed may present for example data for output, a request for output data, data for input, a request for input data, or a combination of the aforementioned.

Preferably, the virtual devices are implemented in Java™, PHP or LUA. In practice, real and simulated devices and machines present device interfaces and real users present user interfaces, and all these entities can be regarded as presenting interfaces or types of virtual entities according to various embodiments of the present invention.

Virtual Device

Figure 2A:
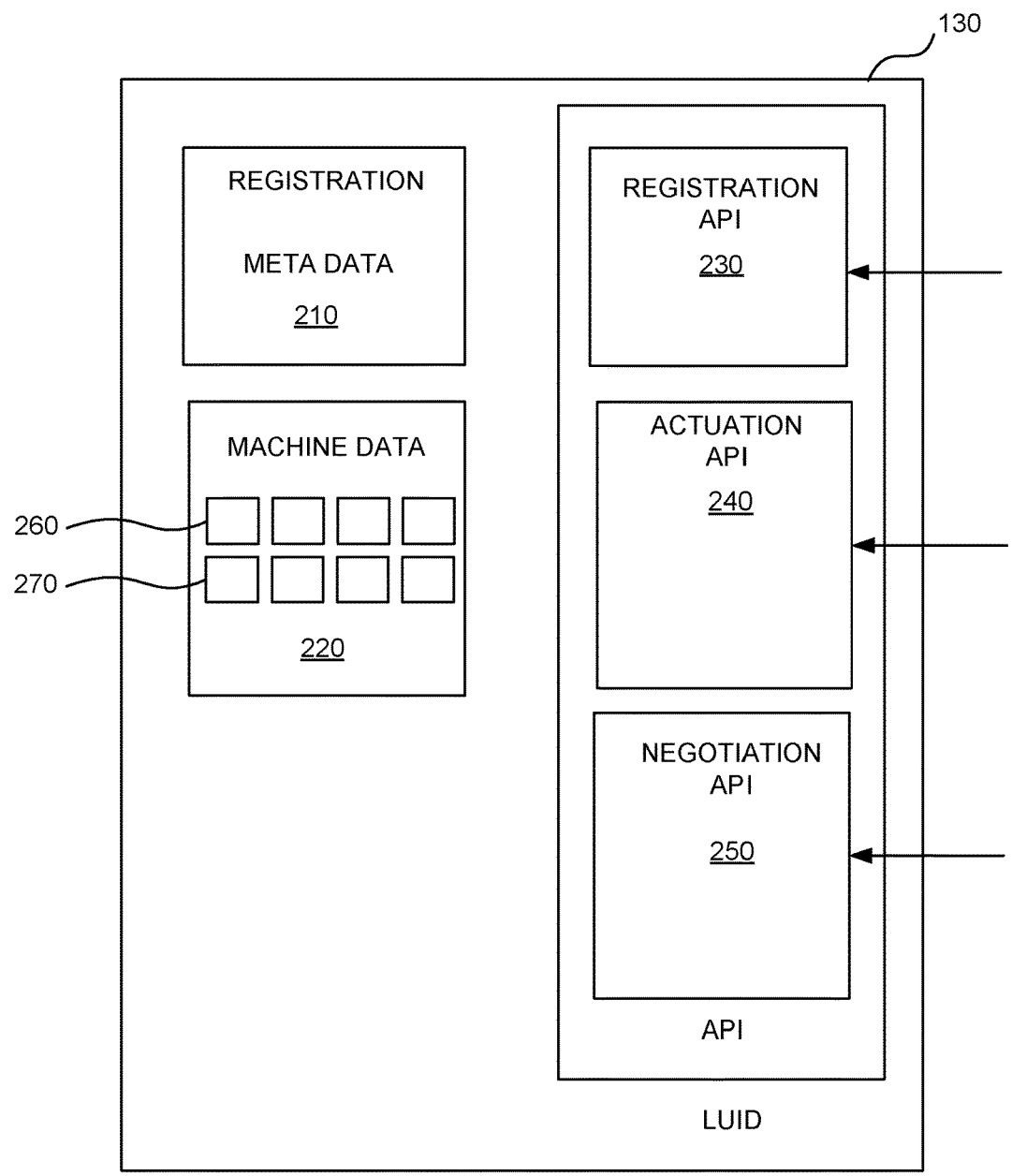
FIG. 2A is a schematic diagram of a virtual device according to the embodiment of FIG. 1.

FIG. 2A illustrates a virtual device 130 connectable to receive data from, and provide setting parameters to, the real or simulated device 100. The virtual device 130 includes meta data and machine data. The meta data includes registration meta data 210 and the machine data 220 includes, for example, data payload 260 and settable parameters 270. In this case the machine data 220 comprises sensor-actuator data like the data payload 260 from the real or simulated device 100 and settable control parameters 270 of the real or simulated device 100.

This proxy device 130 runs on a web server or other computer. Registration meta data 210 may include for example a physical device identifier and descriptors indicating the nature of the device and definitions of the API formats the device presents. It should be noted that in the following embodiments of the present invention, APIs, REST APIs and callback APIs consist of URLs (uniform resource locator). Thus, these terms can be described in terms of URLs.

In the example shown in FIG. 2A the virtual device 130 is configured to present three APIs: a registration API 230, an actuation API 240, and a negotiation API 250. Each API is configured to receive a particular type of data. Specifically, the registration API is used in a registration process with the registrar computer 300 to receive registration data, the actuation API 240 is used to receive requests to set a control parameter of the real or simulated device 100, and the negotiation API is used to receive requests for data and requests for permission to send an actuation request.

According to this embodiment a virtual device is a proxy for its counterpart real or simulated device and is capable of running on a server or other computer in for example Java™ or LUA or PHP servlets, but also future programming languages which may be suitable for implementing embodiments of the invention. The virtual devices will run as instances on a server capable of presenting the APIs for many real devices.

Each virtual device describes itself and its resources by means of semantic descriptors. This could be done for example using the Resource Description Framework (RDF) or a similar semantic descriptor language, or by XML. The virtual device 130 may present for example a RESTful API as its registration API for receiving registration data from the registrar computer. The virtual device 130 may present for example a device-specific RESTful API as its actuation API. In this example the APIs of the virtual device 130 are presented to a trusted registrar computer as will be described in more detail hereinafter. In this way the registration meta data of the virtual device 130 describes the nature and properties of the real or simulated device as well as prescribing the nature and format of the machine API. Virtual devices 130 thus contain the meta data to indicate their own identity and security for actuations. So a virtual device can present the data and data formats it supplies, the things it can consume (e.g. "turn lights on") and also things others can register for (e.g. "tell me when your light is on"). In this embodiment, a device network identifier (i.e. LUID (locally unique identifier)) is part of the device URL. So there is one API for each virtual device enabling the device to act as broker of its own resources.

Registration of Devices

Figure 3:
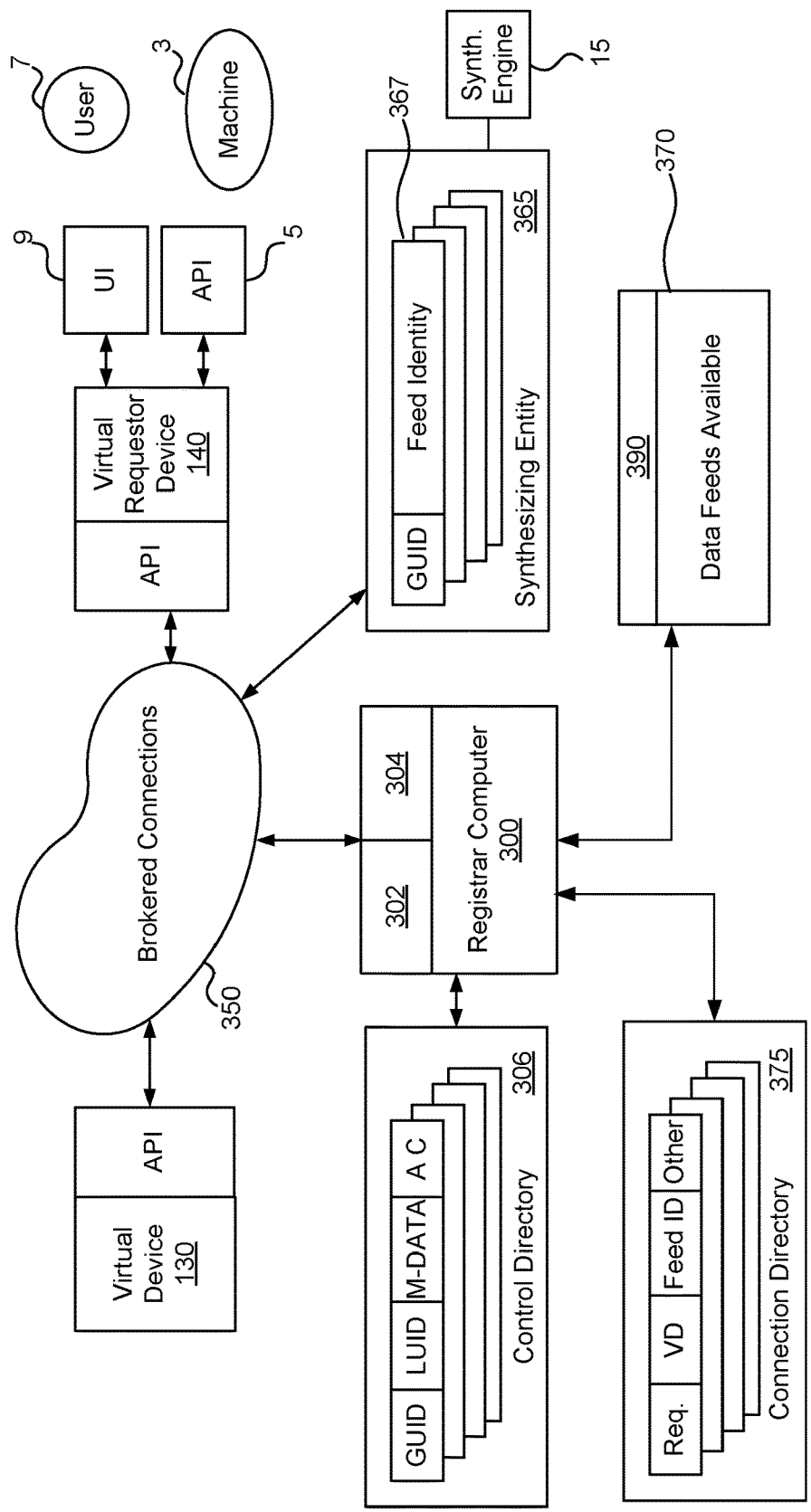
FIG. 3 is a schematic diagram of a registrar computer according to an embodiment of the present invention.

FIG. 3 shows a registrar computer 300 according to an embodiment of the present invention. The registrar computer 300 is a trusted controlling authority. The registrar computer 300 may be located at a single location and it may comprise one or more separate devices or machines. Alternatively, the registrar computer 300 may be distributed over a plurality of locations.

The registrar computer 300 is responsible for the issuance of global unique identifiers covering all virtual device populations. It is capable of arbitrating communications between a virtual device 130 and a requestor virtual device 140, thereby facilitating the transfer of data between the corresponding real requestor 110 and real or simulated device 100.

The registrar computer 300 maintains a control directory 306 which comprises data about virtual devices in association with a global unique identifier capable of uniquely identifying them within all of the virtual device populations. The data maintained in the control directory 306 for each virtual device includes for example: device network ID (i.e. LUID), global unique ID (GUID), physical device location, device type, sensor definitions, actuator definitions, and service definitions. This data may be presented in the form of RDF data.

The registrar computer 300 also maintains a connection directory 375 which comprises data about each connection brokered by the registrar computer 300. The data maintained in the connection directory 375 for each brokered connection includes, for example, information identifying the virtual requestor device (e.g. GUID), information identifying the virtual device providing the feed (e.g. GUID), information identifying the data feed (e.g. data feed ID), and any other suitable information.

Figure 4A:
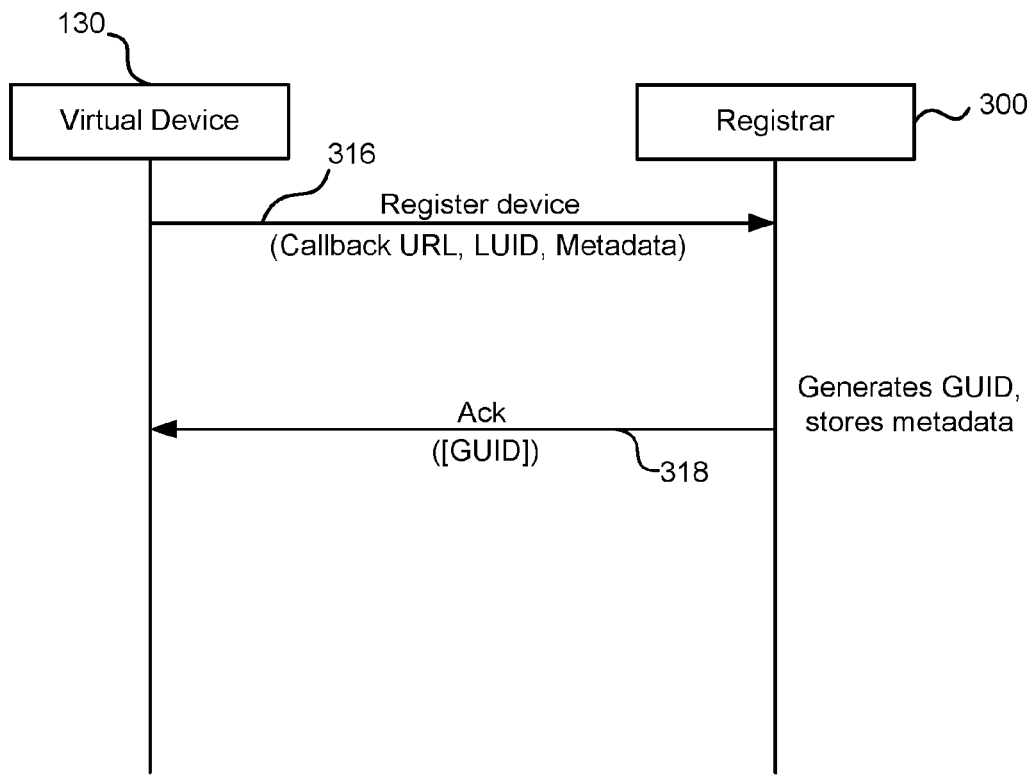
FIG. 4A is a device registration sequence according to an embodiment of the present invention.
Figure 4B:
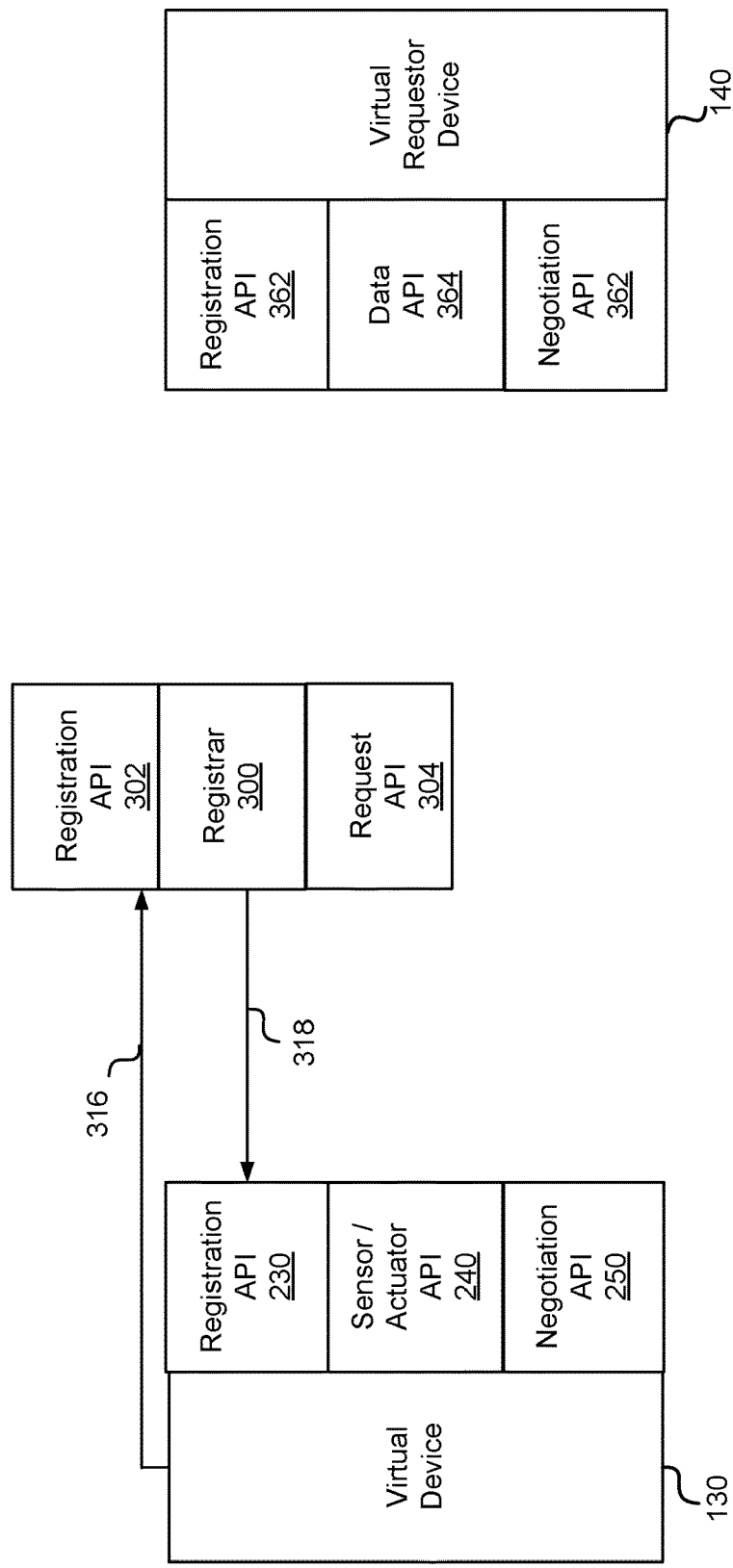
FIG. 4B is schematic diagram illustrating the registration of a virtual device with the registrar computer.

FIGS. 4A and 4B illustrate a device registration sequence. A real or simulated device 100 comes online and communicates with the server 18 over the local bridge network to establish its counterpart virtual device 130. Virtual devices may be established by any suitable method, for example by sending an identification packet (e.g. including identification information for the real device 100, such as, the real device's locally unique device network ID (LUID)) to a known registration address of server 18 in the local network and then, optionally, responding to a challenge from the server 18 in order to prove its credentials. Then the identification information for the real device 100 (e.g. the LUID) can be added to a database on the virtual device server 18 thus establishing the device's APIs in the virtual device server.

Note that the virtual device 130 on the virtual device server 18 can include meta data relating to the device that goes beyond anything received from the real or simulated device 100 when the real or simulated device 100 establishes its virtual device counterpart 130. This allows the virtual device to be enriched over the counterpart real or simulated device. In particular, the virtual device may know more about the real or simulated device than the real or simulated device knows about itself. In some cases the meta data stored by the virtual device may be updated by another virtual device. For example, where the real device is a passive device, such as a jumper, another virtual device acting as a proxy for a washing machine may provide information, such as, how many times the jumper has been washed.

In one embodiment, the registration address may be on a different server, for example a server that holds virtual device profiles which can be looked up based on an information item in the registration message. The virtual device profile can then define the virtual device 130 established on the virtual device server 18, including for example aspects of one or more of its APIs. In this way an active or a passive real or simulated device (including inanimate objects) can establish virtual devices with useful data and/or functions going beyond data from or functions of the real device itself).

These communications on the bridge networks can be using any suitable protocol, such as, but not limited to, UDP, TCP, MQTT, or SMS. Where the real device is an active device the counterpart virtual device may include an API capable of receiving actuation data to cause a change in the state or configuration of the real device. For example a virtual device may comprise an API capable of receiving actuation data to cause the code on the real device to be upgraded according to instructions of a remote operator (which may be a machine).

To initiate the registration process, at step 316 the virtual device calls the registration API 302 of the registration computer 300 and provides its callback URL, device network ID (i.e. LUID) and its meta data 210, 220. Optionally, the virtual device may present certain permissions data to the registrar computer 300. This permissions data defines for example access criteria (AC) to be recorded in association with the relevant device record. Access Criteria (AC) may define for example, who can access the device data, on what conditions, whether the data feed can be generally published, and on what conditions. Alternatively, all or some of the access criteria data may be retained on the virtual device.

At step 318 the registrar computer 300 acknowledges this registration event back to the registration API 230 of the virtual device 130. Optionally, the global unique identifier (GUID) is provided back to the virtual device. In certain embodiments the GUID is held securely at the registrar computer 300.

In this way, a real or simulated device 100 is registered by its proxy virtual device 130 with the registrar computer 300. A real device may be a plug and play device which on first use automatically connects to server 18 to establish its virtual device, and, optionally, also onward to a preconfigured URL of the registrar computer via the network 350. Alternatively, or in addition, a scheduler running on the server 18 can be triggered from time to time to run an update to cause new virtual devices 130 established by the addition of real or simulated devices to present to the registrar computer. The virtual device will present the real or simulated device's meta data, including registration data, to the registrar computer 300. The virtual device will typically be one instance of many running on the virtual device server 18.

For example an HVAC system may present: a building identity (possibly including a post code); a manufacturer's identifier indicating it is a heating ventilation and air conditioning system; the fact that it can sense hot water temperatures, monitor heating operations and ventilation actuation; and it may also indicate formats (e.g. units) for sensed data and control data.

Service definition data may include for example how often the physical device 100 reports (frequency), volume of data, availability as defined by permissions, historical period (if any), and or how accurate the raw data is.

The registrar computer 300 receives within the identifiers and meta data contextual information which assists with device authentication and access criteria data relating to the real or simulated device and its data. Certificated communications protocols may also be used to further enhance security.

As the registrar computer 300 knows the definition of the data feed available from the virtual device 130, and it also knows on what conditions the data feed for a particular device can be made available to others, it can publish the attributes of the virtual device's data feed in a feed directory 370 for consumption by authorised requestors. Requestors are authorised or not by the virtual devices according to the access criteria set in the corresponding real device. Alternatively, or in addition, an administrator may update access criteria of the virtual device, for example in response to a policy change or a payment event. The feed directory 370 may be searchable via a search interface 390 as will be described in more detail hereinafter.

In order for a brokered or negotiated connection to be established with a virtual device so that its data feed can be consumed, the corresponding requestor entity must register with the registrar computer 300. There may be several types of requestor entities, including for example a human user 7 capable of using a user interface UI 9 or a machine requestor 3 capable of using a machine interface (or API) 5 to generate a requestor virtual device 140 in this example on a server 40. Each requestor virtual device 140 has a locally unique identifier (LUID).

Figure 2B:
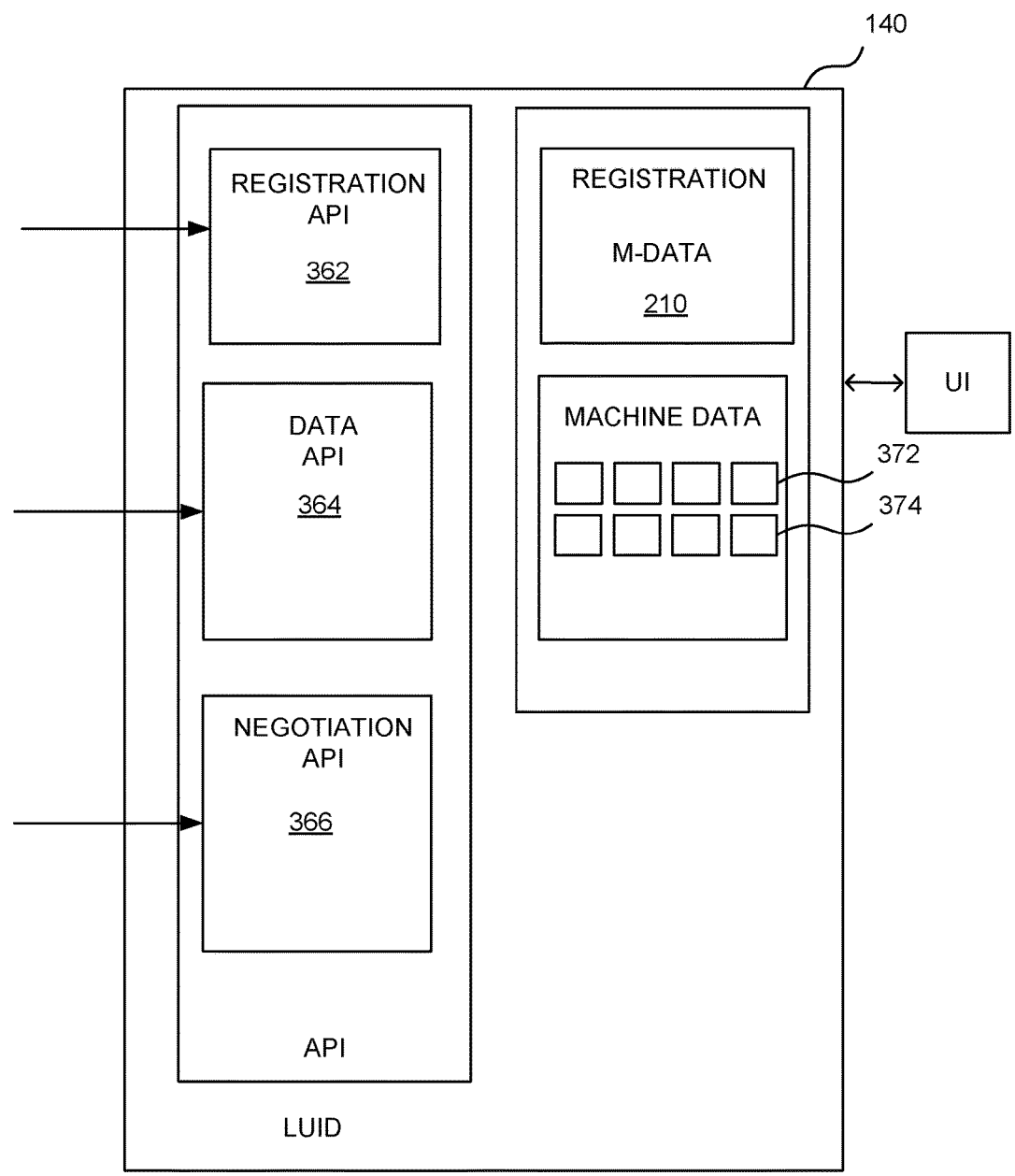
FIG. 2B is a schematic diagram of a requestor virtual device according to the embodiment of FIG. 1.

With reference to FIG. 2B, the requestor virtual device 140 is a virtual device that has three APIs: a registration API 362 for receiving registration data from the registrar computer 300, a data API 364 for receiving requested data feeds from virtual devices, and a negotiation API 366 for receiving negotiation data from the registrar computer when the requestor virtual device 140 is requesting a data feed or requesting permission to send an actuation request to a virtual device.

During registration the requestor virtual device provides its local unique identifier (LUID) to the registration API of the registrar computer 300. The registrar computer stores the received LUID in association with a global unique identifier (GUID). The registrar computer 300 may also provide the GUID to the registration API of the requestor virtual device where it is stored as part of the registration meta data 210.

The registrar computer 300 records the existence of the virtual requestor device 140 and its requirements in broadly the same way as it records the capabilities and access criteria of a virtual device 130. In this way, the requestor virtual devices 140 are capable of presenting requests for communications under the brokered or negotiated control of the registrar computer 300 and according to the virtual device 130 access criteria.

Note that human users may include remote requestors and/or a network administrator. The system or its users may also use a synthesizing engine 15 to synthesise desirable feeds from feeds available in the feed directory 370.

As described hereinbefore in relation to virtual devices generally, a requestor virtual device may be defined in terms of RDF or similar. In this way a data feed originating from a physical device 100 is accessed by a requesting entity via a connection 350 brokered or negotiated by the registrar computer 300. Synthesizing engine 15 can be used to modify the data feeds and/or synthesize new data feeds based on for example a combination of one or more existing data feeds and/or operations on one or more existing data feeds.

Registrar Computer's Arbitration of Requests Requesting a Data Feed

If the user knows of a source device it wants to receive data from and/or has identified a data feed in the data feed directory 370, it can request the data feed according to the following process.

The registrar computers main function is to arbitrate between the source of a feed (the virtual device) and any prospective consumers of the feed (the virtual requestor devices). Its objective is to give control to the producing entities rather than the requestors to prevent the requestors from swamping the producers with requests in a denial of service type of attack. In this embodiment there is no direct communication from the requestor virtual device to the virtual device. There is direct communication, in the other direction, from the source virtual device to the requestor virtual device. In this example the process causes the requestor to open a data API for the source virtual device to call with the data requested.

Figure 5A:
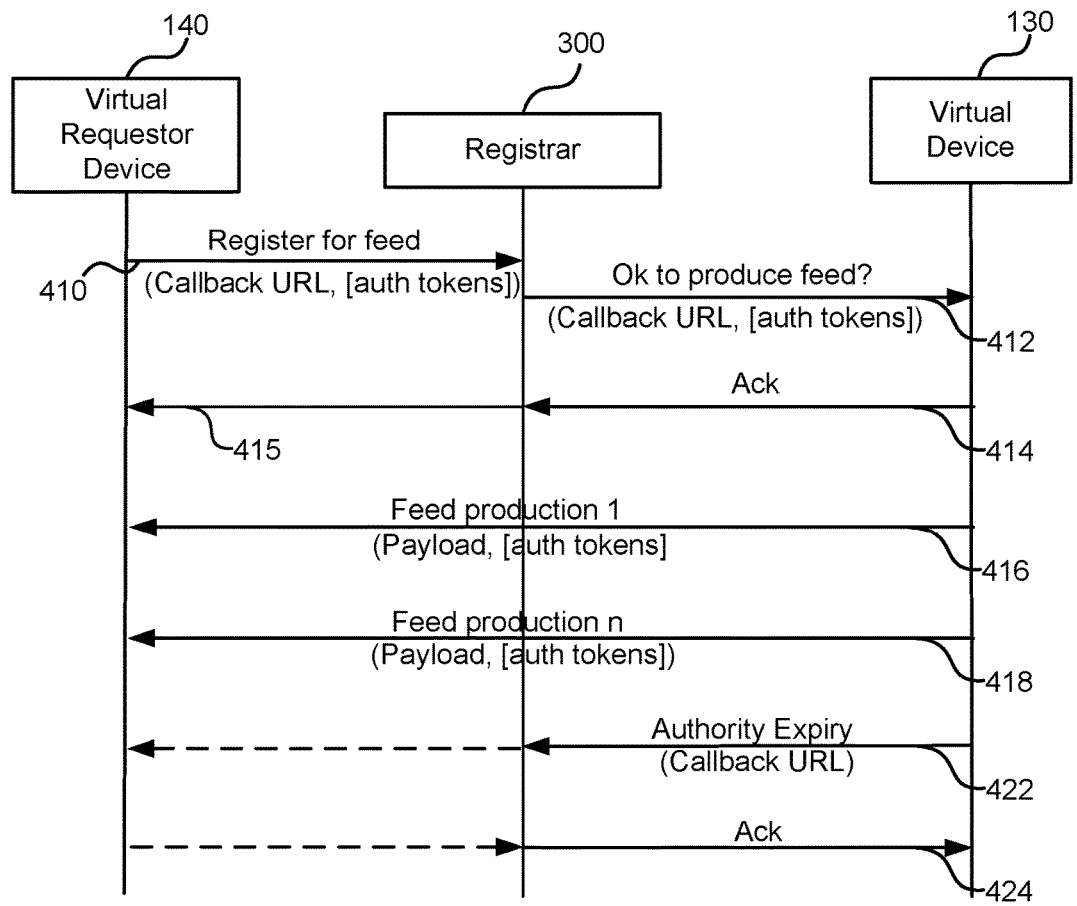
FIG. 5A is a feed request sequence according to an embodiment of the present invention.
Figure 5B:
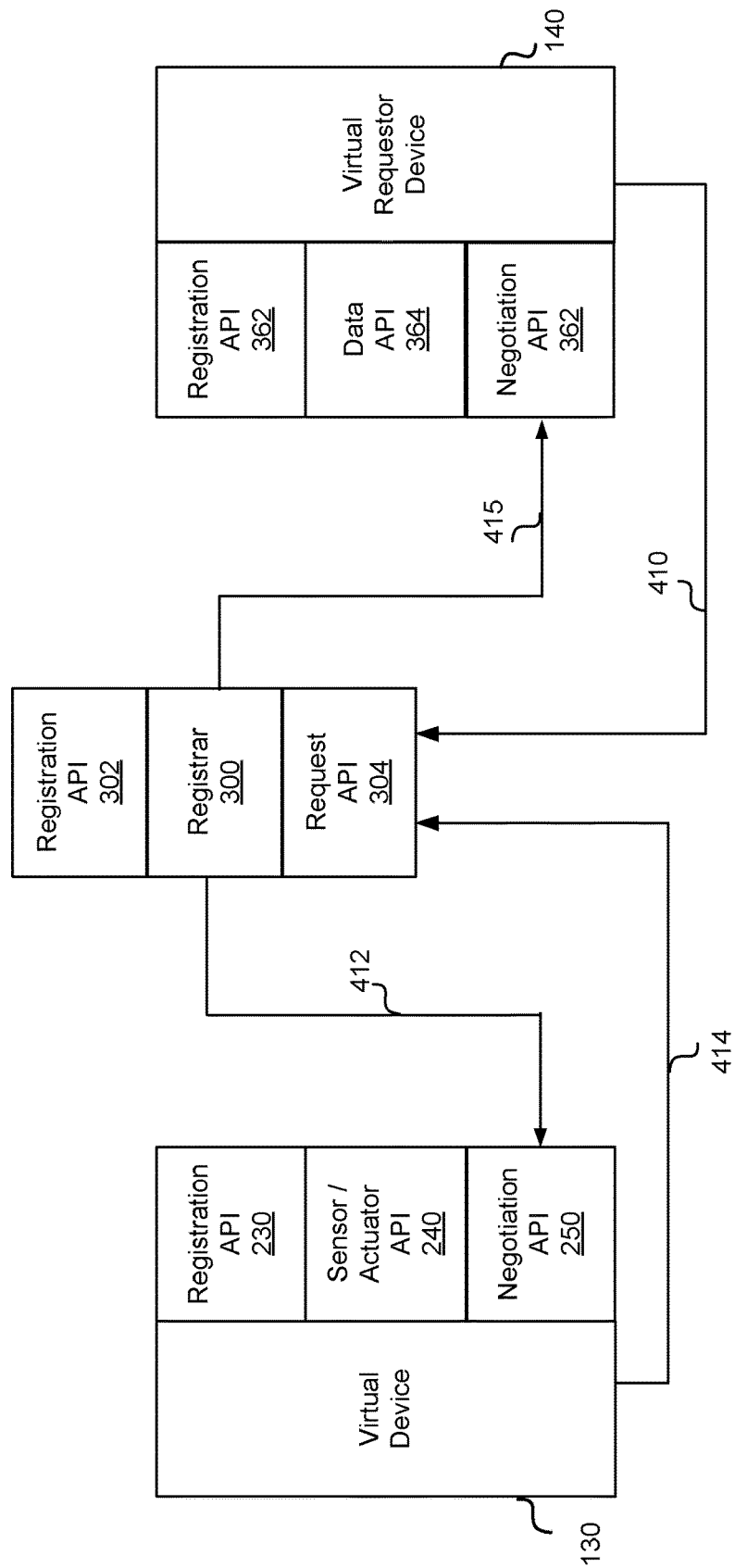
FIG. 5B is a schematic diagram illustrating a requestor virtual device registering for a data feed from a virtual device according to an embodiment of the present invention.
Figure 5C:
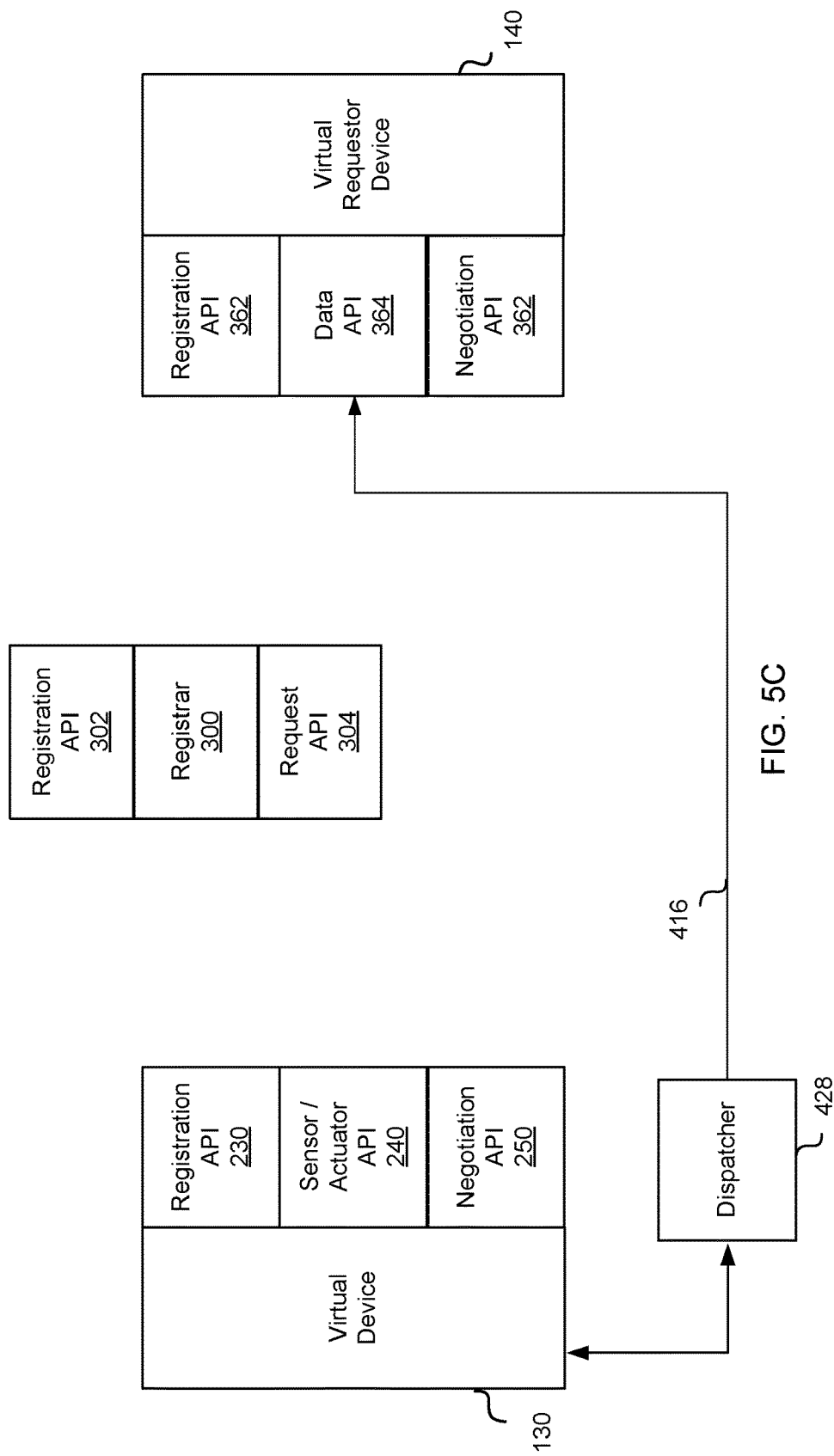
FIG. 5C is a schematic diagram illustrating a virtual device sending a data feed to a requestor virtual device in response to the data feed registration of FIG. 5B.

An exemplary communication process for requesting a feed is explained with reference to FIGS. 5A, 5B and 5C.

At step 410, the requestor virtual device 140 asks for authority from the registrar computer 300 for a data or a data feed and passes its callback URL for the relevant source virtual device to call. In this embodiment the requestor provides a callback RESTful URL. Optionally, the virtual requestor device 140 also includes authorisation information of some type; in this example tokens are included.

At step 412, the registrar computer 300 checks the access permissions for the requestor virtual device 140 with the source virtual device 130 and passes the callback URL of the requestor virtual device 140 to the source virtual device 130 so it knows where to call.

The source virtual device 130 may process the request (e.g. send the request data to the virtual requestor device 140 using the relevant URL) or add the requested data feed and relevant URL to a schedule of all the callbacks it needs to call. In some cases the schedule is stored by a dispatcher 428 (see FIG. 5C) which the virtual device 130 periodically accesses. In either case the source virtual device 130 sends an acknowledgement 414 back to the registrar computer 300. The registrar computer 300 may pass on the acknowledgement 415 to the virtual requestor device 140.

In step 416, the source virtual device 130 calls all the callbacks it has recorded in its schedule of callbacks as stored in the dispatcher 428. In this example this is achieved with HTTP POSTs. The source virtual device therefore POSTs the requested data to all authorised requestors who have requested it when the event occurs. This includes at least the step of the production of data payload (and optionally also authentication tokens) from the source virtual device 130 to the callback URL provided by the virtual requestor device 140. Note with reference to FIGS. 5B and 5C that it is apparent that in the case of both requests and authorisations (and if present acknowledgements) the communication is between a virtual device and registrar computer only; whereas the provision of data payload from the source virtual device 130 is directly to the virtual requestor device 140. More specifically, the provision of data payload is from the source virtual device to the data API 364 of the virtual requestor 140 in response to the callback request.

As illustrated by step 418, there may be a number of successive data payload events in which data is provided from the source virtual device to the virtual requestor according to the device specifications.

In this embodiment, the registrar computer informs the source virtual device of aged/invalid tokens so that it can stop calling the virtual requestor device to provide it with data, as indicated by step 422. Step 424 is an acknowledgement from the source virtual device 130 that it needs no longer callback the virtual requestor device 140 with data.

The registrar computer 300 therefore verifies the identity and authority of the virtual requestor device by reference to the authentication data (local and global Ds) and access criteria (if available) associated with the source device. The registrar computer may also use additional contextual information to further authenticate the identity of the source virtual device and the data available from it. In some cases the registrar computer may provide the additional contextual information to a third party to authenticate the identity of the source virtual device and/or the data available from it.

Setting Parameters and Actuation of Remote Devices

Figure 6A:
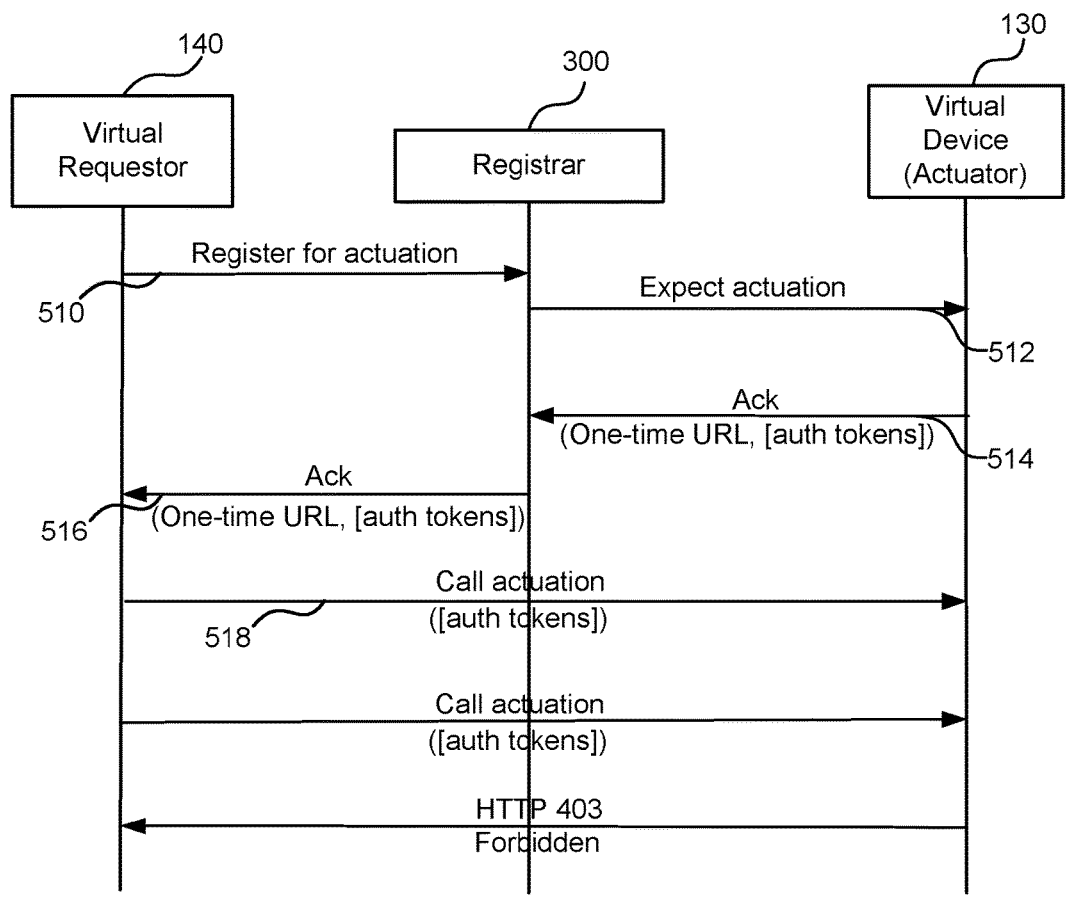
FIG. 6A is a sequence diagram illustrating the communication process between a requestor virtual device and a virtual device for actuating a device according to an embodiment of the present invention.
Figure 6B:
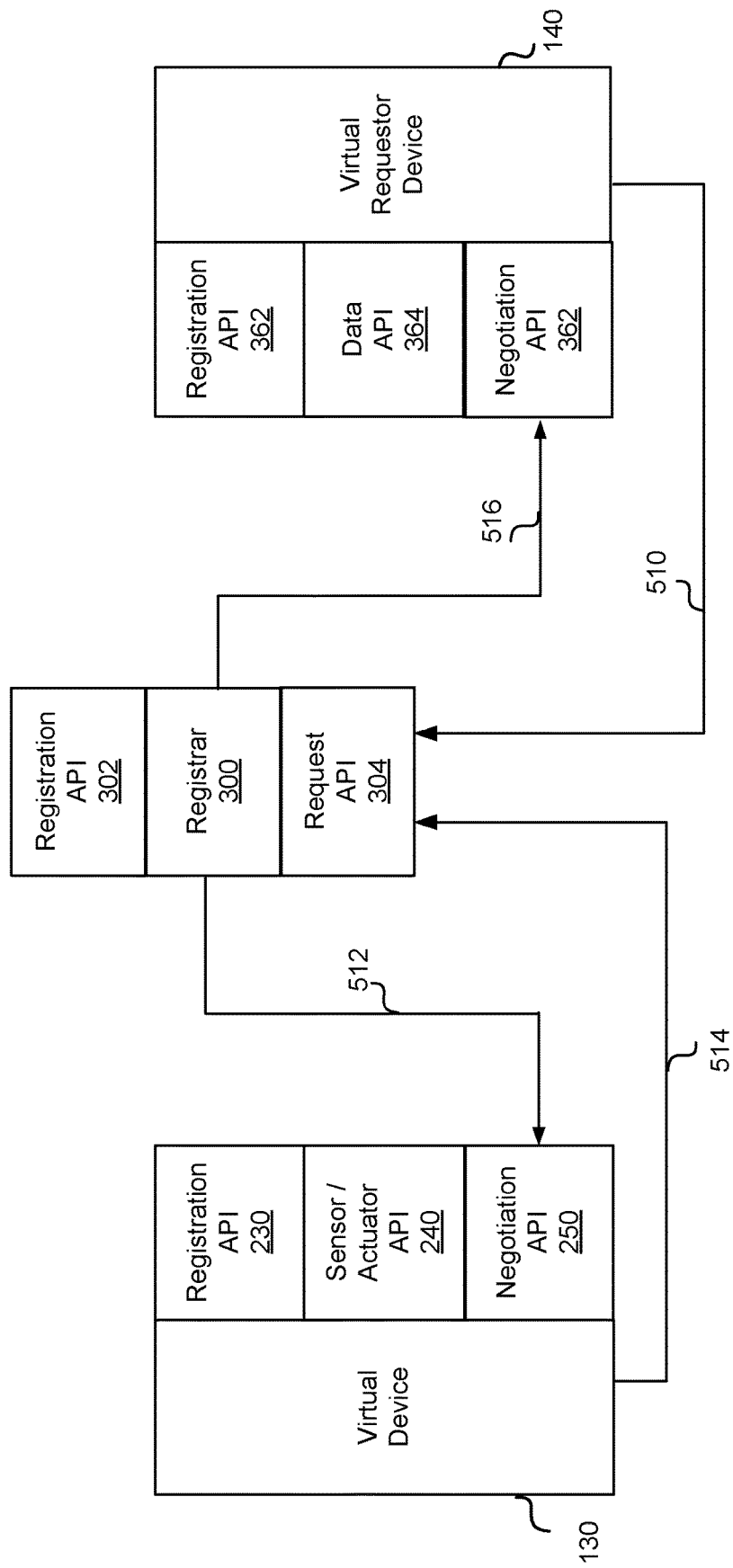
FIG. 6B is a schematic diagram illustrating a requestor virtual device requesting actuation of a virtual device according to an embodiment of the present invention.
Figure 6C:
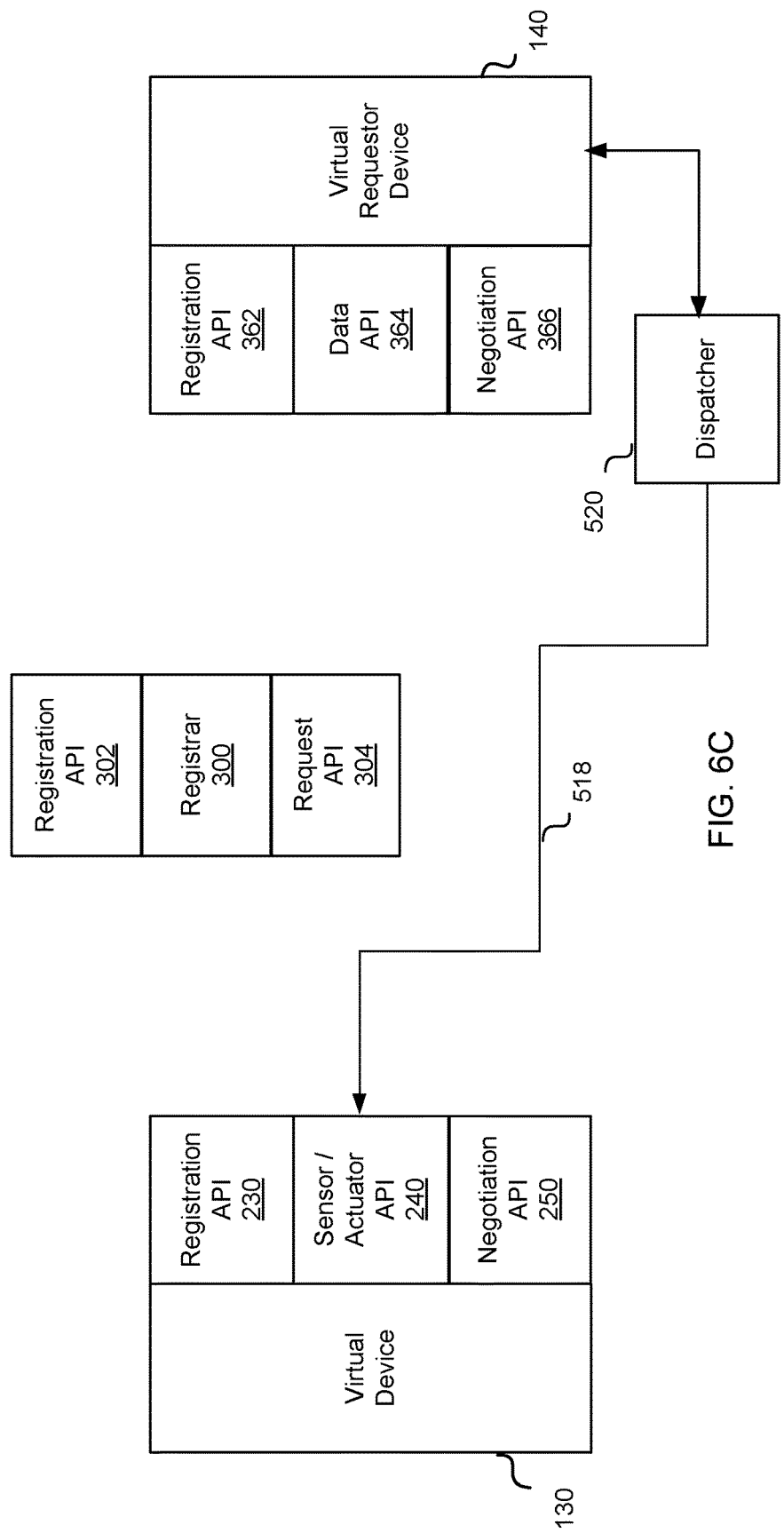
FIG. 6C is a schematic diagram illustrating a requestor virtual device actuating a virtual device.

For example the requesting entity may seek a hot water temperature feed from an HVAC system at 31 Waterloo Road; and it may seek to turn off the immersion heater in the event a threshold temperature is exceeded. Actuation with a one-time URL will now be explained with reference to FIGS. 6A, 6B and 6C. In particular, FIG. 6A illustrates an example process for actuating a remote device, FIG. 6B is a schematic of the negotiation process, and FIG. 6C is a schematic of the actuation. Actuating a device means to make a change in the operation or configuration of the device or updating/changing the data stored by the device.

This process deliberately cedes control to the source entities of the data payload in order to prevent the source entities from being swamped with requests in a denial of service type of attack. In this embodiment there is no direct communication from the virtual device to be actuated to the requestor virtual device that requests the actuation. There is direct communication, in the other direction, from the requestor virtual device to the virtual device to be actuated. In this example the virtual device to be actuated opens an actuation API for the requestor to call with the data.

An exemplary communication process for actuating a virtual device is explained with reference to FIG. 6A.

At step 510, the virtual requestor device 140 asks for authority from the registrar computer 300 to supply the target virtual device 130 with actuation data, for example a payload in the form of one or more settable parameters or one or more actuation conditions, or a combination of the aforementioned. The virtual requestor device may ask for authority from the registrar computer 300 by sending an actuation request to the registrar computer 300. The actuation request may include information specifying the virtual device the request applies to and the actuation data (e.g. one or more settable parameters or one or more actuation conditions) identifying one or more actions to be performed by the virtual device.

At step 512, the registrar computer 300 checks the authorisation for the requested actions with the virtual device 130 capable of being actuated and tells the virtual device to expect actuation.

At step 514, the virtual device 130 to be actuated acknowledges the request and supplies its callback URL to the registrar computer 300. This embodiment uses a one-time (obfuscated) URL, optionally along with authentication information, all of which is passed on by the registrar computer 300 to the virtual requestor device 140 at step 516.

The virtual requestor device 140 may process the callback URL (e.g. it uses the callback URL to provide the settable parameters and/or actuation conditions to the target virtual device 130) or record the callback URL to a schedule of all the callbacks it needs to action. For example, the callback URLs and the associated actuation data (e.g. settable parameters and/or actuation conditions) may be stored in a dispatcher 520 which is accessible to the virtual requestor device 140.

The virtual requestor calls the callbacks recorded in its schedule of callbacks (e.g. those callbacks stored in the dispatcher 520). In this example this is achieved via HTTP POSTs of the settable parameters and/or actuation conditions to the callback URLs as shown in step 518. The virtual requestor device 140 may optionally further provide authorisation tokens or security mandated by the target virtual device 130.

Note with reference to FIGS. 6B and 6C that it is apparent that in the case of both actuation requests and authorisations (and if present acknowledgements) the communication is between a virtual device 130 or virtual requestor device 140 and registrar computer 300 only; whereas the provision of actuation data (e.g. settable parameters and/or actuation conditions) from the virtual requestor device 140 is directly to the target virtual device 130. More specifically, the provision of actuation data (e.g. settable parameters and/or actuation conditions) is from the virtual requestor device 140 (via its dispatcher 520, where a dispatcher is used) to the actuation API 240 of the target virtual device 130.

Subsequent to the initial negotiation, the registrar computer 300 may inform the virtual device of aged/invalid tokens so that it can stop issuing one-time URLs or calling the virtual devices with data. A virtual device which has the capacity to be an actuator (i.e. perform actions) will need to be certain that only authenticated and authorised requestors can call the callback URL to perform the action. To this end, virtual devices capable of being actuated may present a one-time URL for a requestor to call. This approach prevents replay attacks from unauthorised and/or unauthenticated requestors. Again, the registrar computer 300 will be the arbitrator with an objective of putting the virtual device 130 in control over which virtual requestor device 140 are allowed to call it and what security protocols they have to comply with in order to do it.

In the simple case, "Knowledge is authority", but other security mechanisms could be mandated as well such as OAuth, white-list, SSL, password, token, etc. in the control of the virtual device capable of being actuated. The virtual device mandates the security and may reject requestors if the security criteria are not satisfied. Given all virtual devices are registered with the registrar they may each be regarded as a known entity. There is not necessarily a need for the virtual devices to know that the virtual requestors have been authorised in any other way than if they present the correct authentication tokens in the process flow.

In one embodiment adapted for highly secure applications a pre-amble request for a challenge key (implemented in the same way as requesting data) could be mandated by the virtual device and the virtual requestor device then has to present the correct answer to the challenge as well as the request for actuations. The correct answer to the challenge may be required within a time limit.

In some cases an actuation may cause an update to the virtual device's meta data. For example, if the actuation causes new software or firmware to the corresponding real device then the virtual device may automatically update the meta data to reflect the new software or firmware. In this manner one virtual device (e.g. a requestor virtual device) can be used to update the meta data of another virtual device. A virtual device's meta data may also or alternatively be updated after an external change (a change not triggered through actuation) is made to the real or simulated device. For example, if the firmware or software on a real device is manually updated by a technician the real device may be configured to notify the virtual device of the change.

In some cases, after the meta data of a virtual device has been updated (e.g. as a result of actuation or external changes to the real or simulated device) it may provide an update to the registrar computer 300. In some examples the virtual device may provide all of the meta data to the registrar computer 300. In other example, the virtual device may provide only the changes to the meta data to the registrar computer. The registrar computer then stores the updated meta data in association with the LUID and GUID.

Synthesizing Entity

Consider a situation where a temperature node publishes temperature every 10 minutes. A user discovers this data feed and wishes to aggregate historical information from the feed. Assuming a 10 minute interval is acceptable going forwards, there is a challenge in how to get historical data from the system since requests for data result in the requestor being called back according to a virtual devices' callback schedule and thus only when the virtual devices allow.

One solution to this is to have a synthesizing entity 365 which requests one or more data feeds, synthesizes the data feeds, and then posts or publishes the synthesized data feed with the registrar computer 300 for other virtual requestor devices to subscribe to. In this way the synthesizing entity 365 acts as both a virtual requestor device (by requesting and obtaining a data feed from a virtual device) and a virtual device (by providing a data feed to a requestor virtual device). Accordingly, the synthesizing entity may have three APIs: a registration API, a negotiation API, and a data API as described above so that it can receive and transmit data or data feeds.

With reference back to FIG. 3, the synthesizing entity 365 records feed information 367 for each data feed received from another virtual device. The feed information 367 may comprise, as shown in FIG. 3, the global unique identifier GUID for the virtual device that generated the feed and information identifying data feed (e.g. data feed ID). The synthesizing entity 365 uses a synthesizing engine 15 to generate a synthesized feed from one or more received data feeds. For example the synthesizing engine may be configured to generate a synthesized feed by combining one or more data feeds; combining data from a single feed (e.g. data received from a single data feed over a period of time); and/or combining a data feed and external data. Details of example synthesized feeds will be described with reference to FIG. 7.

In some cases the feed information 367 may also comprise the data received via the data feed. In other cases the data may be discarded once it has been used to generate a synthesized feed.

Once a synthesized feed has been generated the synthesizing entity 365 notifies the registrar computer 300 of the synthesized feed and the registrar computer 300 then adds the synthesized feed to the data feed directory 370 so that it can be accessed by other virtual requestor devices. In particular, it allows the registrar computer 300 to arbitrate a suitable request which uses a one-time URL from the requestor for the synthesized data feed.

Figure 7:
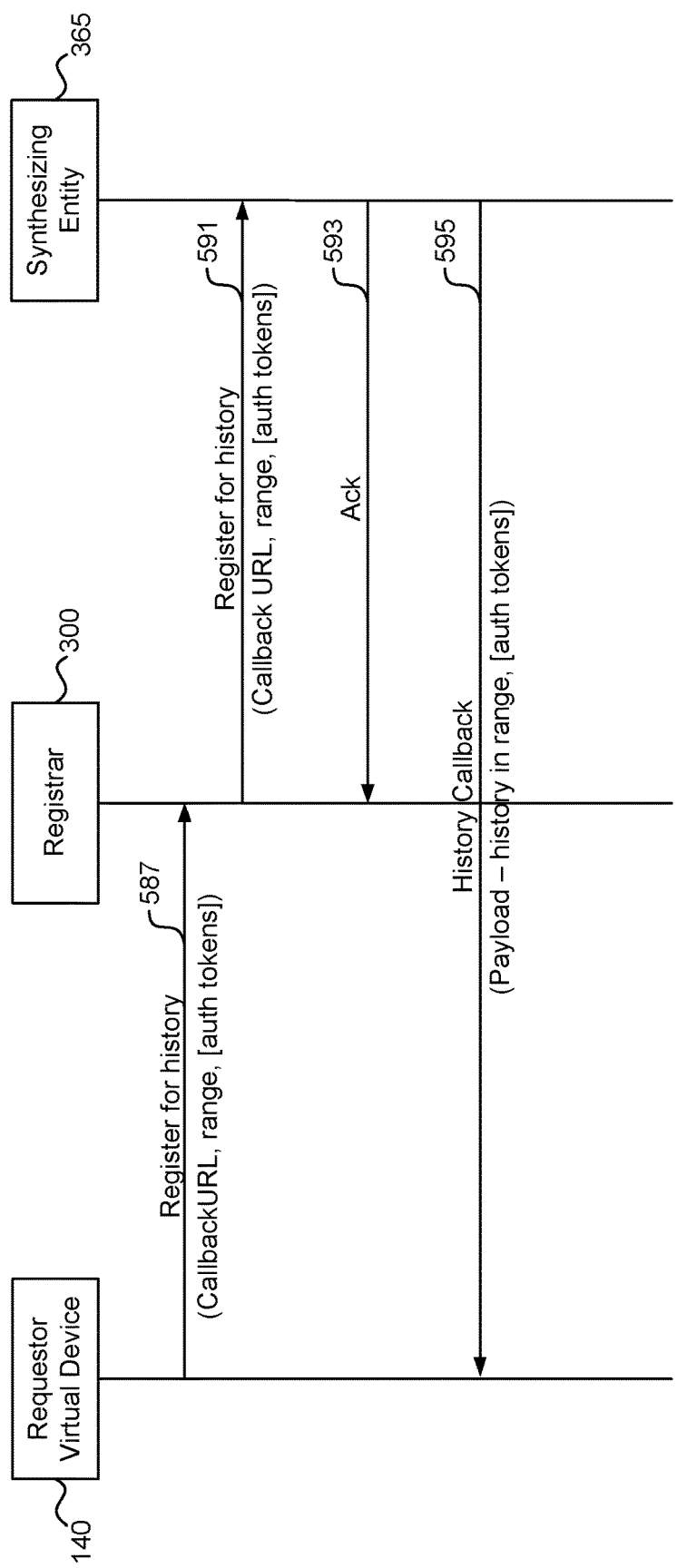
FIG. 7 is a sequence illustrating the communication process between a requestor virtual device and a virtual device for aggregating historical data from a data feed according to an embodiment of the present invention.

This process will now be described with reference to FIG. 7.

At step 587, the requestor virtual device 140 registers for a one-time POST of historical data with the registrar computer 300. This involves the requestor virtual device 140 sending the requestors callback URL, the time period of interest, and optionally authentication information to the registrar computer 300.

At step 591, the registrar computer 300 calls the synthesizing entity 365 to establish if the request is authorised passing the callback URL, specified time period, and any authentication information (if any).

If the synthesizing entity 365 authorises the request it records the callback request in its schedule of callbacks (e.g. via a dispatcher) and acknowledges back to the registrar computer 300 at step 593.

At step 595, the synthesizing entity 365 HTTP POSTs the specified historical data to the callback URL of the requestor virtual device 140. This POST optionally also includes any authentication information which may be required by a security protocol. If current data is desired on a continuing basis a separate request for a current data feed can be placed simultaneously. This could be done automatically by the registrar computer 300 where an application is used to generate a new request including both current and historical date ranges.

In any above process implemented using REST, the API consists of URLs. i.e. you HTTP GET or HTTP POST a URL and the server fetches or performs some action dependent on the URL. In such cases it is possible to consider the URL as being like a "function" in a traditional API and the HTTP parameters as being the arguments to the function. A callback URL (or function) is thus one provided by the caller to the called function with a view to receiving answers/acknowledgements in the future. In this way a type of secure asynchronous API network can be implemented.

Local Network

In the foregoing description, any data feed from the virtual device or actuation thereof may be passed to the real requestor via a proprietary protocol, over a standard protocol such as TCP or UDP, or a machine-to-machine protocol such as MQTT, or even SMS.

Data Feed Types

Figure 8:
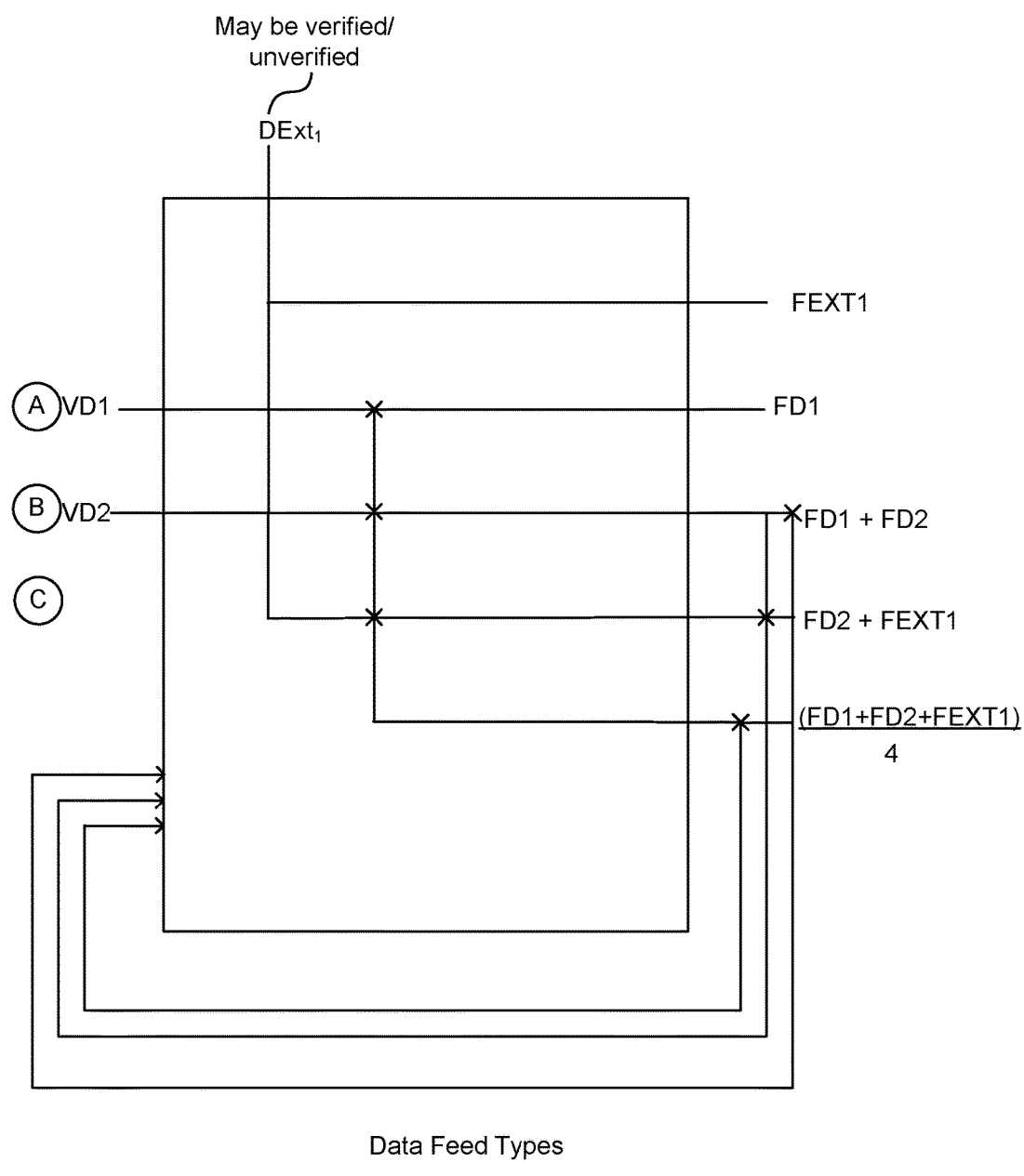
FIG. 8 is a schematic diagram illustrating exemplary types of data feeds according to an embodiment of the present invention.

FIG. 8 illustrates a number of exemplary types of data feed available according to an embodiment of the present invention. As described herein before, human or machine users can use a search interface 390 to search the feed directory 370 for published data feeds available from existing registered virtual devices (including synthesizing entities). Where the request cannot be serviced from the existing data feed directory, users can use applications to synthesise new data based on processing of one or more existing feeds, the combination of two or more existing feeds, or a combination of the aforementioned.

A first type of data feed is the authenticated data feed "FD1" from virtual device VD1. This single data feed comprises only the data from the real or simulated device D1. The identity of this device is known to the registrar computer 300 and, preferably, some or all its attributes are also known to either the virtual device server or the registrar computer 300. Therefore FD1 is an authenticated data feed.

A second type of data feed is the external data feed FExt1 generated from the external device DExt1 located externally of the network supervised by registrar computer 300. In this context, "external" means that the registrar computer does not hold information suitable for the authentication of the external device. This single data feed comprises only data from the external device Ext1 but since the external device Ext1 is not known to the registrar computer 300, this data feed is non-authenticated. Integrity of external feeds can be assessed in meaningful ways by for example user endorsements, ratings, popularity, repeat subscriptions or similar mechanisms.

A third type of data feed is the data feed "FD1+FD2". This data feed has been synthesised (e.g. by a synthesizing entity 365) by combining the data feeds of virtual device VD1 and virtual device VD2 according to some predetermined operation. The identities of the physical devices corresponding to each of the virtual devices VD1 and VD2 are known and verifiable and, preferably some their device attributes are also known to the registrar computer 300. The registrar computer 300 also knows and records the nature of the operation binding the data feeds in order to keep track of integrity and ancestry. As a result, this synthesised data feed is an authenticated data feed.

A fourth type of data feed is the data feed "FD2+FExt1". This data feed has been synthesised (e.g. by a synthesizing entity 365) by combining the data feeds of virtual device VD2 and external device DExt1. Although the identity of the real or simulated device D2 corresponding to the virtual device VD2 is known to the registrar computer 300, the identity of the external device DExt1 is not known with any confidence and therefore the synthesised data feed FD2+FExt1 is non-authenticated. The registrar computer knows this because it records ancestry of the synthesised data feeds in the authentication data table. Given this feed comprises both authenticated and non-authenticated feeds, it is referred to as a hybrid feed; and the hybrid feed itself is non-authenticated.

As illustrated by the fifth data feed "(FD1+FD2+FExt1)/4" any a number of available feeds can be combined and they may be combined using one or more mathematical functions to achieve a desired result feed. In such cases, the registrar computer records both the ancestry by means of links to contributory feeds and also data on each operation performed to combine the feeds. As a general rule, any feed comprising at least one non-authenticated contributory feed or at least one non-authenticated operation is a non-authenticated feed.

It is possible also to have a multi-feed comprising a plurality of unmodified authenticated feeds supplied together. In such cases the multi-feed is authenticated based merely on identity of the constituent feeds and without the need for the registrar computer to record any information about operation (because no operation has been applied in generating the multi-feed).

Any virtual device or application causing the existence of a data feed (e.g. a synthesizing entity 365) can determine whether or not it should be published in the directory, and any access conditions which may apply when third parties wish to access the feed.

In this embodiment the registrar computer 300 keeps a record of the provenance of each device feed and also each synthesised feed. The RDF meta data from the device registration API achieves this for a virtual device 130, 140. For synthesised feeds, there is provided a link to the parents RDF, and optionally also a record of any operations applied beyond mere aggregation of the constituent data feeds.

In this embodiment, the data feed directory 370 is semantically searchable. Searching tools may take into account data feed authentication (optionally including provenance of constituent feeds where relevant) and or data feed integrity scores applying to external feeds. Where particular data feeds are provided from external sources which are not able to be authenticated by the registrar computer, integrity indicators for these data feeds may be approximately estimated based on indications of reliability from outside the registrar computer's domain. For example, feeds supplied from external sources may be accompanied by one or more of popularity scores, user perceived trust or accuracy levels and or endorsements. Certificates or other known remote authentication methods may be used to authenticate remote sources insofar as that is possible.

Searching and/or searchable results may take into account service definitions as defined herein before. In addition, or in the alternative, searching and/or searchable results may take account of data feed price, which, may in turn, be a factor of integrity, urgency, and/or volume of the data requested. Note that the registrar computer knows which physical devices and virtual devices feeds have high integrity based upon the quantity and quality of authentication information in the entry of the authentication table.

It is possible to configure high integrity networks between authenticated devices and or authenticated devices and requestors in order to create trusted communication frameworks. Such a framework is defined by highly authenticated physical devices and real requestors and may be also VPN communication channels along communication pathways. Likewise, it is possible to create communication frameworks which may include devices that are not authenticated and or network pathways which are less secure. The latter may be perfectly adequate and more cost-effective in some use scenarios.

In preferred embodiments of the data feed directory 370 integrity indicators are provided by the registrar computer 300 in association with data feeds available from the data feed directory such that authenticated feeds are indicated to have high integrity and non-authenticated feeds are indicated to have relatively lower integrity. It is possible hybrid feeds and non-authenticated feeds have meaningful integrity indicators based for example on user indications of popularity, user perceived trust or accuracy levels and or endorsements.

Exemplary Sensor Use Cases (FIG. 9)

An example of a sensor use cases with relatively few devices and relatively few requestors is a home security alarm. Note that only the proprietor of the property and security (police force) monitoring the alarm would know it had been actuated.

An example of a sensor use case with many requestors and relatively few devices would include single-value sensors such as web cams.

An example of a sensor use case with many devices but relatively few requestors would include an aggregator note to service a technician.

An example of a sensor use case with many devices and many requestors is a network of Met office weather stations with public access.

Exemplary Actuator Use Cases (FIG. 10)

An example of an actuator use case with relatively few devices and relatively few requestors is a home lighting system or a home security system.

An example of an actuator use case with a large number of devices but relatively few requestors is an electronic voting system.

An example of an actuator use case with a few devices but a large number of requestors is a traffic light system or for example a utility power distribution system.

An example of an actuator use case with relatively high numbers of devices and requestors are is a publically switchable street light network.

These examples are not intended to be limiting.

In practice, it will be apparent in view of the description herein that many such use cases can be simultaneously supported by embodiments of the present invention.

Alternative Virtual Device Implementation

FIG. 11 illustrates an alternative implementation of a virtual device 1102 configured to receive data from, and provide setting parameters to, a real or simulated device. As with the virtual device 130 of FIG. 2A, the virtual device 1102 of FIG. 11 includes meta data 1104 and machine data 1106 as described above. However, instead of the virtual device 1102 itself comprising one or more APIs to communicate with the registrar computer 300 and/or one or more virtual requestors 140, the virtual device 1102 communicates with a container 1108 which comprises the APIs that allow the virtual device 1102 to communicate with the other devices. In this manner the container 1108 acts as an interface or intermediary between the virtual device 1102 and other devices.

In the example shown in FIG. 11 the container 1108 comprises three APIs for the virtual device 1102: a registration API 230, an actuation API 1112 and a negotiation API 114. As described above with reference to FIG. 2A, each API is configured to receive a particular type of data. Specifically, the registration API 1110 is used in the registration process with the registrar computer to receive registration data, the actuation API 1112 is used to receive request to actuate the virtual device 1102, and the negotiation API 1114 is used to receive request for data and requests for permission to send an actuation request.

In the example shown in FIG. 11, the container 1108 is associated with a single virtual device 1102, however, in other cases the container 1108 may be associated with more than one virtual device and/or one or more virtual requestor devices. In these examples, the container 1108 comprises a set of APIs (e.g. APIs 1110, 1112, and 1114) for each virtual device or each virtual requestor device associated with the container 1108. In these examples the container 1108 may also comprise an entity registry 1116 and a connection registry 1118. The entity registry 1116 is used to keep a record of each virtual device or virtual requestor device associated with the container 1108. For example the entity registry 1116 may store, for each virtual device or virtual requestor device, the LUID, GUID, manufacturer and/or any other suitable data that identifies and/or characterizes the virtual device or virtual requestor device. The connection registry 1118 is used to keep a record of the connections made between a virtual device or virtual requestor device connected thereto and an external device. The connection registry 1118 may comprise, for each connection, information identifying the requestor, the virtual device and the data feed (if appropriate).

Each of the virtual device 1102 and the container 1108 runs on a web server (or set of web servers) or other computer (or set of computers). Where the virtual device 1102 and/or the container 108 are run on a set of computers/servers the computers/servers do not need to be located in the same place. In particular In some cases the virtual device 1102 and the container 1108 are run on the same computer or set of computers. In other cases the virtual device 1102 and the container 1108 may run on different computers or different sets of computers.

The registrar and virtual device servers of the present invention are exemplary computing-based devices which may be implemented as any form of a computing and/or electronic device, and on which the embodiments of the present invention may be implemented.

The registrar computer and virtual device servers comprise one or more processors which may be microprocessors, controllers or any other suitable type of processors for processing computer executable instructions to control the operation of the registrar and virtual device servers in order to function according to any one of the above described embodiments. In some instances, for example where a system on a chip architecture is used, the processors may include one or more fixed function blocks (also referred to as accelerators) which implement a part of the method of any one of the above embodiments in hardware (rather than software or firmware). Platform software comprising an operating system or any other suitable platform software may be provided at the computing-based device to enable application software to be executed on the device.

The computer executable instructions may be provided using any computer-readable media that is accessible by a computing based device. Computer-readable media may include, for example, computer storage media such as a memory and communications media. Such media includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. the memory) is described as within the computing-based device it will be appreciated that the storage may be distributed or located remotely and accessed via a network or other communication link (e.g. using a communication interface).

The computing-based device also comprises an input/output controller arranged to output display information to a display device which may be separate from or integral to the computing-based device. The display information may provide a graphical user interface. The input/output controller is also arranged to receive and process input from one or more devices, such as a user input device (e.g. a mouse or a keyboard). In an embodiment the display device may also act as the user input device if it is a touch sensitive display device. The input/output controller may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A registrar computer configured to negotiate communications between a virtual device and a virtual requestor device over a network to allow data feeds to be consumed without exposure to attacks, the registrar computer comprising:
- a processing device; and
- a memory device having stored thereon instructions, wherein the instructions, when executed by the processing device, cause the registrar computer to perform the steps of:
- maintaining a control directory of virtual devices registered with the registrar computer;
- maintaining a data feed directory comprising entries indicating data feeds available from one or more of the virtual devices registered in the control directory;
- assigning an integrity indicator to one or more data feeds in the data directory based on a provenance of the corresponding data feed, wherein the integrity indicator for a data feed that has been generated by applying a mathematical function to the data feed is further based on an integrity value assigned to the mathematical function and wherein the integrity value is dependent upon the operations that form the mathematical function;
- publishing, via the network, a listing of one or more data feeds from the data feed directory that are available to the virtual requester along with the integrity indicator assigned to the one or more data feeds;
- receiving from the virtual requestor device, via the network, a request for at least one of the published data feeds, the request including an address associated with the virtual requestor; and
- using the control directory and the data feed directory to provide, via the network, an indication of the request received from the virtual requestor device to at least one virtual device from which the requested at least one of the published data feeds is made available whereby the at least one virtual device may use the address associated with the virtual requestor to directly send to the virtual requestor, via the network, the requested at least one data feed and, thereby, to allow the at least one data feed to be consumed without exposure to attacks.

2. The registrar computer of claim 1, wherein the provenance of the corresponding data feed comprises a list of real devices that have contributed to generation of the corresponding data feed.

3. The registrar computer of claim 1, wherein the virtual device is configured to act as a proxy for a real device.

4. The registrar computer of claim 1, wherein the virtual requestor device is configured to act as a proxy for a real requestor device.

5. A method for using a registrar computer to negotiate communications between a virtual device and a virtual requestor device over a network to allow data feeds to be consumed without exposure to attacks, comprising:
- maintaining by the registrar computer a control directory of virtual devices registered with the registrar computer;
- maintaining by the registrar computer a data feed directory comprising entries indicating data feeds available from one or more of the virtual devices registered in the control directory;
- assigning by the registrar computer an integrity indicator to one or more data feeds in the data directory based on a provenance of the corresponding data feed, wherein the integrity indicator for a data feed that has been generated by applying a mathematical function to the data feed is further based on an integrity value assigned to the mathematical function and wherein the integrity value is dependent upon the operations that form the mathematical function;
- publishing by the registrar computer, via the network, a listing of one or more data feeds from the data feed directory that are available to the virtual requester along with the integrity indicator assigned to the one or more data feeds;
- receiving by the registrar computer from the virtual requestor device, via the network, a request for at least one of the published data feeds, the request including an address associated with the virtual requestor; and
- using the control directory and the data feed directory by the registrar computer to provide, via the network, an indication of the request received from the virtual requestor device to at least one virtual device from which the requested at least one of the published data feeds is made available whereby the at least one virtual device may use the address associated with the virtual requestor to directly send to the virtual requestor, via the network, the requested at least one data feed and, thereby, to allow the at least one data feed to be consumed without exposure to attacks.

6. The method of claim 5, wherein the provenance of the corresponding data feed comprises a list of real devices that have contributed to generation of the corresponding data feed.

7. The method of claim 5, wherein the virtual device is configured to act as a proxy for a real device.

8. The method of claim 5, wherein the virtual requestor device is configured to act as a proxy for a real requestor device.

* * * * *